(12) United States Patent
Alam et al.

(10) Patent No.: US 12,355,621 B1
(45) Date of Patent: Jul. 8, 2025

(54) SYSTEMS AND METHODS FOR IMPLEMENTING A REPEATABLE NETWORK ARCHITECTURE

(71) Applicant: AVIATRIX SYSTEMS, INC., Santa Clara, CA (US)

(72) Inventors: Hammad Alam, Monroe Township, NJ (US); Nauman Mustafa, Santa Clara, CA (US); Saad Mirza, Murphy, TX (US); Shahzad Ali, Mountain House, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 54 days.

(21) Appl. No.: 17/330,370

(22) Filed: May 25, 2021

Related U.S. Application Data

(60) Provisional application No. 63/190,746, filed on May 19, 2021, provisional application No. 63/038,701, filed on Jun. 12, 2020.

(51) Int. Cl.
*H04L 65/102* (2022.01)
*H04L 41/08* (2022.01)
(Continued)

(52) U.S. Cl.
CPC ...... *H04L 41/0843* (2013.01); *H04L 41/0886* (2013.01); *H04L 45/02* (2013.01); *H04L 45/38* (2013.01); *H04L 65/102* (2013.01)

(58) Field of Classification Search
CPC ... H04L 45/02; H04L 65/102; H04L 41/0886; H04L 41/0843
See application file for complete search history.

(56) References Cited

U.S. PATENT DOCUMENTS 9,621,428 B1 * 4/2017 Lev .................. H04L 41/0806
10,318,285 B1 * 6/2019 Jodoin ................ G06F 11/3612
(Continued)

FOREIGN PATENT DOCUMENTS

CA      2781496 A1 * 7/2011 ........... G06F 16/583
WO  WO-2017205755 A1 * 11/2017 ........... G06F 15/173
WO  WO-2022108672 A1 * 5/2022 ........... G06F 11/3006

OTHER PUBLICATIONS

U.S. Appl. No. 17/330,371, filed May 25, 2021 Non-Final Office Action dated Apr. 15, 2022.

*Primary Examiner* — Sandarva Khanal
(74) *Attorney, Agent, or Firm* — Winstead PC

(57) ABSTRACT

A cloud computing system built in accordance with a repeatable network architecture is disclosed that includes a controller, a first set of spoke gateways and a first transit gateway. The controller is configured to deploy the first set of spoke gateways in a first cloud thereby forming an applications layer of the repeatable network architecture, deploy the first transit gateway in the first cloud thereby forming a global transit layer of the repeatable network architecture, and establish communicative couplings between each of the first set of spoke gateways and the first transit gateway. The controller is also configured to deploy a first set of spoke VPCs within the first cloud, wherein each of the spoke VPCs has deployed therein one of the first set of spoke gateways, and a first transit VPC within the first cloud, wherein the first transit gateway is deployed in the first transit VPC.

20 Claims, 15 Drawing Sheets

(51) Int. Cl.
*H04L 41/084* (2022.01)
*H04L 45/00* (2022.01)
*H04L 45/02* (2022.01)

(56) References Cited

U.S. PATENT DOCUMENTS

| | | | | |
|---|---|---|---|---|
| 10,382,328 | B1* | 8/2019 | Whittaker | H04L 45/583 |
| 10,855,660 | B1* | 12/2020 | Gernhardt | H04L 63/0435 |
| 11,237,941 | B2* | 2/2022 | Velammal | G06F 9/544 |
| 11,252,126 | B1 | 2/2022 | Thunga et al. | |
| 2002/0004773 | A1* | 1/2002 | Xu | G06Q 40/06 |
| | | | | 707/999.2 |
| 2005/0232230 | A1* | 10/2005 | Nagami | H04L 41/22 |
| | | | | 370/351 |
| 2012/0131176 | A1* | 5/2012 | Ferris | G06F 9/5072 |
| | | | | 709/224 |
| 2013/0103837 | A1* | 4/2013 | Krueger | G06F 9/5072 |
| | | | | 709/249 |
| 2013/0185413 | A1 | 7/2013 | Beaty et al. | |
| 2015/0052525 | A1* | 2/2015 | Raghu | H04L 67/10 |
| | | | | 718/1 |
| 2015/0263885 | A1* | 9/2015 | Kasturi | H04L 41/5051 |
| | | | | 709/220 |
| 2016/0048408 | A1* | 2/2016 | Madhu | H04L 47/783 |
| | | | | 718/1 |
| 2016/0173487 | A1* | 6/2016 | Griffith | H04L 63/0823 |
| | | | | 713/156 |
| 2016/0253160 | A1* | 9/2016 | Alger | H04L 67/34 |
| | | | | 717/177 |
| 2016/0371433 | A1* | 12/2016 | Polesskiy | A63F 13/825 |
| 2017/0207968 | A1* | 7/2017 | Eicken | H04L 67/01 |
| 2017/0230451 | A1* | 8/2017 | Paramasivam | H04L 67/535 |
| 2017/0339013 | A1* | 11/2017 | Allen | H04L 41/145 |
| 2018/0007002 | A1* | 1/2018 | Landgraf | H04L 63/0263 |
| 2019/0245748 | A1* | 8/2019 | Gandhewar | H04L 41/0893 |
| 2019/0372858 | A1* | 12/2019 | Krishnamurthy | H04L 41/145 |
| 2020/0004591 | A1 | 1/2020 | Das et al. | |
| 2020/0012480 | A1* | 1/2020 | Rizo | G06F 21/577 |
| 2020/0059492 | A1* | 2/2020 | Janakiraman | H04L 63/0263 |
| 2020/0249997 | A1* | 8/2020 | Ough | G06F 9/5027 |
| 2020/0304383 | A1* | 9/2020 | Bajaj | H04L 41/0843 |
| 2020/0314174 | A1 | 10/2020 | Dailianas et al. | |
| 2020/0322249 | A1* | 10/2020 | Liu | H04L 43/20 |
| 2020/0382345 | A1* | 12/2020 | Zhao | H04L 45/04 |
| 2020/0412608 | A1* | 12/2020 | Dunbar | H04L 45/04 |
| 2021/0029204 | A1* | 1/2021 | Bhatnagar | H04L 41/0813 |
| 2021/0092153 | A1* | 3/2021 | Wei | H04L 45/02 |
| 2021/0168034 | A1* | 6/2021 | Qian | H04L 43/0811 |
| 2021/0168056 | A1* | 6/2021 | Qian | H04L 63/0272 |
| 2021/0266255 | A1* | 8/2021 | Ganapathy | H04L 12/4633 |
| 2021/0266256 | A1* | 8/2021 | Janakiraman | H04L 45/02 |

\* cited by examiner 952 954 962

| | Gateway Detailed Information ⟲ | | | |
|---|---|---|---|---|
| ▦ Dashboard | AWS West Transit GW | | | |
| ⊡ Topology | Connection to Onprem | | | |
| ⁓ Network Flow Visualization | VGW Connections | Name | Peer IP | VGW_ID CGW_ID |
| Transit Network | | Name | Peer IP | Type |
| | | West 2-Colo | 54.190.236.146.54.244.9.72 | BGP |
| 956 | | West 2-Colo-Xng | 54.190.236.146.54.244.9.72 | BGP |
| | Cloud Connections | Name | Peer IP | |
| | Firenet Configuration | Transit FireNet Function Enabled. Egrees: True Inspection: True Inspecting:[SPOKE:West2-VPC2-GW] Management Access: no | | |
| | Onprem Connection Name | West2-Colo West 2-Colo-Xng | | |
| | Spoke Peer List | West2-VPC1-GW(10.100.0.0/16) West2-VPC2-GW(10.100.0.0/16) | | |
| | Transit Peering List | Azure-West-Transit-GW Azure-East-Transit-GW | | |
| | TGW CIDRs | 10.91.0.0/16 10.90.0.0/16 | | |
| | Transit Peering Site CIDRs | 10.115.0.0/16 10.116.0.0/16 10.118.0.0/16 10.106.0.0/16 10.105.0.0/16 30.30.30.0/24 172.20.64.0/20 | | |
| | Total Learned CIDRs | 172.16.80.0/20 20.20.20.0/30 | | |
| | Static Learned CIDRs | | | |
| | Advertised Local CIDRs | 10.118.0.0/16 10.91.0.0/16 10.115.0.0/16 10.105.0.0/16 10.101.0.0/16 10.116.0.0/16 10.90.0.0/16 10.106.0.0/16 172.20.64.0/20 30.30.30.0/24 10.100.0.0/16 | | |

FIG. 9C

- Dashboard
- Topology
- Network Flow Visualization
- Transit Network

956

952
954
964

Gateway Routing Table

Name: AWS-West-Transit-GW

| Destination | Via | Dev | NexthopIP | Nexthop Gateway | Status |
|---|---|---|---|---|---|
| default | 10.102.0.145 | eth2 | | | up |
| default | | tun-36BEEC92-0 | 54.190.236.146 | West2-Colo | up |
| default | 10.102.0.193 | eth0 | | | up |
| 10.90.0.0/16 | 10.102.0.17 | eth1 | | | up |
| 10.90.0.0/16 | 10.102.0.17 | eth1 | | | up |
| 10.100.0.0/16 | | tun-0A640013-0 | 10.100.0.19 | | up |
| | | tun-0A640033-0 | 10.100.0.51 | | up |
| | | tun-0A640035-0 | 10.100.0.54 | | up |
| | | tun-0A640038-0 | 10.100.0.56 | | up |
| | | tun-0A64003A-0 | 10.100.0.58 | | up |
| | | tun-0A64003D-0 | 10.100.0.61 | West2-VPC-GW | up |
| 10.118.0.0/16 | | tun-0A6600175-0 | 10.102.1.117 | Azure-West-Transit-GW-hagw | up |
| 10.120.0.0-/16 | 169.254.113.5 | tun-36BEEC92-0 | 54.190.236.146 | West2-Colo | up |
| 10.120.0.0-/16 | 169.254.113.5 | tun-36BEEC92-0 | 54.190.236.146 | West2-Colo | up |
| 20.20.20.0/30 | | tun-36BEEC92-0 | 54.190.236.146 | West2-Colo | up |
| 20.20.20.0/30 | | tun-0A6600175-0 | 10.102.1.117 | AWS-West-Transit-GW-hagw | up |
| 30.30.30.0/24 | | tun-0A6B00FD-0 | 10.107.0.253 | AZURE-East-Transit-GW | up |
| | | tun-0A6B00D1-0 | 10.107.0.209 | | up |
| | | tun-0A6B00F1-0 | 10.107.0.241 | | up |
| | | tun-0A6B00F0-0 | 10.107.0.240 | | up |
| | | tun-0A6B00F5-0 | 10.107.0.245 | | up |
| | | tun-0A6B0165-0 | 10.107.1.101 | AZURE-East-Transit-GW-hagw | up |

*FIG. 9D*

SYSTEMS AND METHODS FOR IMPLEMENTING A REPEATABLE NETWORK ARCHITECTURE

CROSS-REFERENCE TO RELATED APPLICATIONS

This application claims the benefit of priority on U.S. Provisional Application No. 63/038,701, filed Jun. 12, 2020, and on U.S. Provisional Application No. 63/190,746, filed May 19, 2021, the entire contents of each are incorporated by reference herein.

FIELD

Embodiments of the disclosure relate to the field of network architectures. More specifically, one embodiment of the disclosure pertains to a network architecture that may be repeated for use within multiple regions within a cloud computing environment provided by a single cloud provider or within multiple cloud computing environments provided by multiple cloud service providers. Further embodiments disclose systems and methods of implementing the repeatable architecture with a network architecture platform.

GENERAL BACKGROUND

As companies transition from primarily hosting computing resources locally, e.g., hosting server and storage devices at on-premise data centers, to primarily utilizing such resources of a commercial provider to perform computing workloads remotely via the internet, e.g., utilizing cloud computing resources, an emphasis has been placed on the security of data and processing hosted within the cloud computing resources ("cloud computing"). Cloud computing resources provided by a commercial provider are often referred to as a "public cloud." Portions of the public cloud, which may be referred to as virtual private clouds (VPCs) or virtual private networks (VNETs), may be provisioned for individuals or individual companies. As both VPCs and VNETs are known, the terms will be used interchangeably unless otherwise stated with a particular embodiment. For purposes of clarity, the term VPC will be used generally throughout the disclosure.

Cloud computing provides Infrastructure as a Service (IaaS), where resources are provided as part of a public cloud network and made accessible as a service to organizations as well as the persons associated with these organizations such as administrators, employees, contractors, or the like (hereinafter, "users"). One of these services allows users to run software components (e.g., software instances such as virtual servers) within the public cloud network. Hence, the migration of software functionality into the public cloud network has led to greater usage of virtual private networks deployed within the public cloud network.

However, as ubiquitous as cloud computing has become recently, typical methods for building a cloud computing environment leave much to be desired. As is often the case, a user may migrate a portion of their computing needs (storage or processing) to cloud computing. However, such is done without forethought as to how future migration may occur. Further, upon subsequently migrating a second portion of their computing needs to cloud computing either utilizing resources of a single cloud service provider or those of multiple cloud service providers, there is often a disconnect between the first migration and second migration.

More specifically, network engineers or administrators tasked with migrating computing needs to cloud computing often have to do duplicative work between a first migration and subsequent migrations. For instance, scripts or automations developed during the first migration typically need to be re-developed during the second migration, especially when the first and second migrations utilize different cloud service providers.

Further, when utilizing multiple cloud service providers in the fashion described above, the network engineer or administrator has created multiple cloud computing environments that are distinct and wholly separate from one another. Specifically, when constructs deployed during the first migration are operating on computing resources of a first cloud service provider and constructs deployed during the second migration are operating on computing resources of a second cloud service provider, the two sets of constructs are isolated from one another and are unable to communicate.

Additionally, such isolation results in a lack of overall visibility, meaning that the network engineers or administrator cannot obtain network traffic analysis (e.g., status of constructs, metrics or statistics of network traffic flow, etc.) across all of the users' computing needs being handled in the cloud. Specifically, the different cloud service providers each provide visibility to computing needs handled on their own computing resources.

As one example, when an organization utilizes cloud computing resources provided by both GOOGLE® and AMAZON®, a network administrator from the organization cannot obtain visibility of the network traffic or the deployed constructs associated with the clouds provided by both cloud services providers in a single location. Instead, the network administrator is only capable of obtaining visibility of network traffic propagating through and constructs deployed in the GOOGLE® cloud via an interface provided by GOOGLE® and the same for the AMAZON® cloud. Additionally, the network administrator is unable to deploy or otherwise control constructs in both clouds from a single interface.

Thus, what is needed is a network architecture that is repeatable across regions of cloud computing resources provided by a single cloud service provider and also repeatable across cloud computing resources provided by multiple cloud service provider. Additional needs include such a network architecture providing control over and visibility of all constructs and connections therebetween regardless of the cloud in which the constructs are deployed.

BRIEF DESCRIPTION OF THE DRAWINGS

Embodiments of the disclosure are illustrated by way of example and not by way of limitation in the figures of the accompanying drawings, in which like references indicate similar elements and in which:

FIGS. 9B-9D are illustrations of example visualizations of a transit network visualization generated by the visibility logic 304 in accordance with some embodiments.

DETAILED DESCRIPTION

Figure 1:
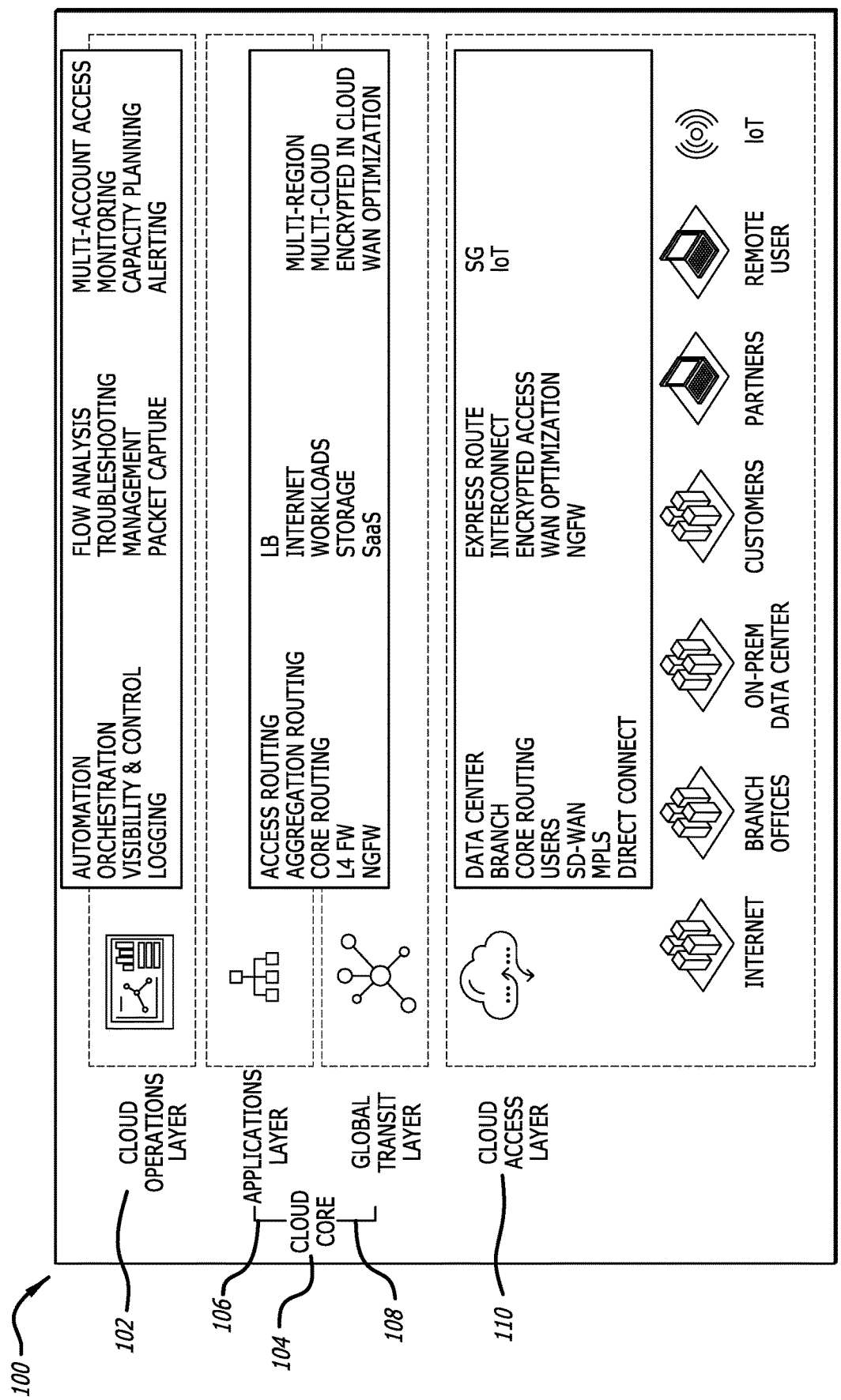
FIG. 1 is a diagram of an exemplary embodiment of a repeatable network architecture in accordance with some embodiments.

Embodiments of the disclosure are directed to a repeatable network architecture and methods of implementing the network architecture to build a cloud computing environment. The repeatable network architecture (architecture) includes a plurality of layers, wherein a one or more constructs are deployed within each of the layers. In some embodiments, the layers include a cloud operations layer, a cloud core layer (including an applications layer and a global transit layer), and a cloud access layer. The architecture is configured such that the constructs deployed therein are each configured to perform certain operations where the combination of operations performed by the constructs across the multiple layers forms an intelligent architecture design.

Further, the architecture may be instructive for building a cloud computing system that spans multiple regions within a cloud provided by a single cloud service provider (CSP) as well as a cloud computing system that spans multiple clouds each provided by a different CSP. Specifically, many of the constructs deployed in each layer may be repeated in a corresponding layer in a separate region or cloud.

Some embodiments of the disclosure provide a network architecture platform (platform) that may be utilized to implement the architecture, where the platform is comprised of certain constructs such as a controller, visibility logic and a set of one or more gateways. In some embodiments, a cloud computing environment may be built by implementing the architecture such that the cloud computing environment includes constructs in at least the cloud operations layer, an applications layer and a global transit layer, and where deployment of constructs within a cloud access layer is optional. In such an embodiment, a controller and visibility logic may be deployed within a virtual private cloud (VPC) that is itself deployed within a first cloud, where the controller and visibility logic are disposed within the cloud operations layer. Additionally, the cloud computing environment may include a plurality of spoke VPCs that are deployed across multiple clouds, where the controller is configured to deploy the spoke VPCs and where the controller is further configured to deploy a spoke gateway in one or more of the spoke VPCs. The spoke VPCs may all be disposed in the applications layer.

The cloud computing environment may also include a plurality of transit VPCs each having deployed therein a transit gateway, where the controller is configured to deploy the transit VPCs and the transit gateways. Each region each cloud may have deployed therein a transit VPC, where the transit VPCs are all disposed within the global transit layer. The controller may be configured to establish a communicative coupling between a spoke VPC and a transit VPC (e.g., each located within the same region of the same cloud) and between transit VPCs. As a result, the spoke VPCs are indirectly communicatively coupled to each other via the transit VPCs regardless of the region or cloud in which each spoke VPC is deployed.

Additionally, the controller may be further configured to establish communicative couplings between the transit VPCs and network devices such as laptops, mobile phones, data centers and/or the internet. In some instances, gateways may be deployed on (or at) the network devices, where such are considered to be deployed within the cloud access layer.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module (s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "construct" may be construed as a virtual or physical logic directed to a particular functionality such as a controller, a gateway, virtual private cloud network (VPC), sub-network, or the like. For instance, as an illustrative example, the construct may correspond to virtual logic in the form of software (e.g., a virtual machine), which may assign a device-specific address (e.g., a Media Access Control "MAC" address) and/or an IP address within an IP address range supported by to a particular IP subnet. Alternatively, in some embodiments, the construct may correspond to physical logic, such as an electronic device that is communicatively coupled to the network and assigned the MAC and/or IP address(es). Examples of electronic devices may include, but are not limited or restricted to a personal computer (e.g., desktop, laptop, tablet or netbook), a mobile phone, a standalone appliance, a sensor, a server, or an information routing device (e.g., a router, bridge router ("brouter"), etc.). It is contemplated that each construct may constitute at least logic residing as part of a public network, although certain constructs may be deployed as part of an "on-premises" ("on-prem" or local) network.

The term "virtual private cloud network (VPC)" may refer to an on-demand, configurable pool of shared resources, which are allocated within a cloud computing platform and provide a certain level of isolation between the different organizations or other entities (hereinafter, "users") using the resources.

The term "transit VPC" may refer to a VPC that is configured, in accordance with one embodiment, to connect multiple VPCs, where the VPCs may be logically isolated and/or virtually located on data centers that may be geographically disparate. A transit VPC serves as a global network transit center that operates as a connection point for spoke VPC-to-spoke VPC communication (e.g., propagation of network traffic having a source IP address in a first spoke VPC and a destination IP address in a second spoke VPC), spoke VPC-to-data center communication (e.g., propagation of network traffic having a source IP address in a first spoke VPC and a destination IP address at a data center), and may also route network traffic to other transit VPCs (e.g., propagation of network traffic having a source IP address in a first spoke VPC connected to a first transit VPC and a destination IP address in a second spoke VPC connected to a second transit VPC), which may then continue propagation of the network traffic.

The term "gateway" may be construed as virtual or physical logic. For instance, as an illustrative example, the gateway may correspond to virtual logic in the form of a software component, such as a virtual machine (VM)-based data routing component that is assigned a Private IP address within an IP address range associated with a VPC including the gateway. The gateway allows Cloud Service Providers (CSPs) and enterprises to enable datacenter and cloud network traffic routing between virtual and physical networks, including a public network (e.g., Internet). Alternatively, in some embodiments, the gateway may correspond to physical logic, such as an electronic device that is communicatively coupled to the network and assigned the hardware (MAC) address and an IP address.

Hence, multiple gateways may be deployed in a VPC and these gateways may be configured to control the flow of traffic from software instances of the VPC to one or more remote sites including computing devices that may process data received from the software instances. Having similar architectures, the gateways may be identified differently based on their location/operability within a public cloud network platform. The "spoke" gateways are configured to interact with targeted instances while "transit" gateways are configured to further assist in the propagation of data traffic (e.g., one or more messages) directed to a spoke gateway within a spoke VPC or a computing device within an on-premises network. Stated differently, a spoke gateway interacts with a user instance while a transit gateway is configured as a hub that routes network traffic. Typically, a transit gateway instance requires more memory and supports additional configurations as compared to a spoke gateway.

The term "controller" may refer to a software instance deployed within a cloud computing environment (e.g., resources of a public cloud network) that manages operability of certain aspects of one or more cloud computing environments spanning across different public cloud networks (multi-cloud network). For instance, a controller may be configured to collect information pertaining to each VPC and/or each gateway and configures one or more routing tables associated with one or more VPCs and/or gateways spanning a multi-cloud network to establish communication links (e.g., logical connections) between different sources and destinations. These sources and/or destinations may include, but are not restricted or limited to on-premises computing devices, gateways or other types of cloud resources.

The term "cloud computing services" may generally refer to computer system resources such as data storage ("cloud storage") and computing resources that is utilized without direct, active management by a user. Cloud computing services may generally be used herein to refer to data centers available to users that are accessible by the internet. In some instances, cloud computing services may also incorporate software and other logic that are accessible by users to have certain tasks executed on the computing resources. The term "cloud computing services" may be used interchangeably with the terms, "cloud" and "cloud services." A cloud may be public (accessible to all users) or private (accessible to a subset of users that provide the required authentication information). Additionally, the term "cloud computing environment" may generally refer to data storage and computing resources of a cloud and all constructs deployed (launched) and configured for processing on the computing resources.

The term "message" generally refers to information in a prescribed format and transmitted in accordance with a suitable delivery protocol. Hence, each message may be in the form of one or more packets, frames, or any other series of bits having the prescribed format.

The term "network device" may be construed as any electronic computing system with the capability of processing data and connecting to a network. Such a network may be a public network such as the internet or a private network such as a wireless data telecommunication network, wide area network, a type of local area network (LAN), or a combination of networks. Examples of a network device may include, but are not limited or restricted to, an endpoint device (e.g., a laptop, a mobile phone, a tablet, a computer, etc.), a standalone appliance, a server, a router or other intermediary communication device, a firewall, etc.

The term "link" may be generally construed as a physical or logical communication path between two or more constructs. For instance, as a physical communication path, wired and/or wireless interconnects in the form of electrical wiring, optical fiber, cable, bus trace, or a wireless channel using infrared, radio frequency (RF), may be used. A logical communication path includes any communication scheme that enables information to be exchanged between multiple constructs.

The term "repeatable" may refer the ability of one or more aspects of a cloud computing environment to be (i) ported from a first region of a cloud service provider to a second region of the cloud service provider, (ii) duplicated from deployment in a first region of a cloud service provider to deployment in a second region of the cloud service provider, (iii) ported from cloud computing services of a first cloud service provider to cloud computing services of a second cloud service provider, and/or (iv) duplicated from deployment in cloud computing services of a first cloud service provider to deployment in cloud computing services of a second cloud service provider. However, the specific configuration of constructs deployed within a single region or cloud (e.g., number of constructs) is not required to be replicated.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Repeatable Network Architecture

Referring now to FIG. 1, a diagram of an exemplary embodiment of a repeatable network architecture is shown in accordance with some embodiments. As illustrated in FIG. 1, the repeatable network architecture includes a plurality of layers, such that certain networking constructs are included in a particular layer. The layering of the constructs in the manner set forth herein enables a network administrator or other user developing a cloud computing environment to do so intelligently and efficiently. As mentioned above, developing a cloud computing environment without a layered approach as disclosed herein often leads to haphazard placement of constructs, development of scripts and connections between constructs that are not repeatable.

Thus, the repeatable network architecture 100 (architecture 100) of FIG. 1 includes a cloud operations layer 102, a cloud core layer 104 that includes an applications layer 106 and a network layer 108, and a cloud access layer 110. In some embodiments, within the framework of the architecture 100, the cloud operations layer 102 includes constructs that perform functionalities of automation, orchestration, visibility and control, logging of network traffic and corresponding events (latency, routing, etc.), network traffic flow analysis, troubleshooting, network management, network traffic packet capture, multi-account access, monitoring, capacity planning and alert generation.

Typically, the constructs deployed within the cloud operations layer 102 include access to network administrators or others (collectively, network administrators) through a graphical user interface (GUI). For instance, a GUI may be accessed and displayed via a web browser and/or via a dedicated software application processing on a network device (e.g., a tablet, laptop, mobile phone, etc.). One of more of the constructs deployed within the cloud operations layer 102 may obtain data pertaining to constructs deployed in other layers and present such data to the network administrator, which may include status/state of constructs or connections therebetween, network traffic flows, etc. Additionally, the GUI may be configured to receive user input that results in alterations to constructs deployed in other layers, such as a change of state, deployment of additional constructs, establishment of connections between constructs (at times, connections may be referred to as attachments), etc.

The cloud core layer 104 may be divided into sub-layers, namely, the applications layer 106 and the network layer 108. The constructs deployed therein, in combination, provide the functionalities of access routing, aggregation routing, core routing, level 4 firewall (L4FW) deployment, next generation firewall (NGFW) deployment, load balancing, internet access, workload processing, storage, software as a service (Saas), multi-region cloud services deployment, multi-cloud services deployment, encryption, and wide area network (WAN) optimization. The constructs deployed within the cloud core layer 104 may be managed by one or more constructs deployed within the cloud operations layer 102. For example, and as will be discussed in detail below, a controller may be deployed in the cloud operations layer 102 that deploys or launches constructs within the cloud core layer 104 and subsequently manages those constructs, where management thereof may refer to establishing connections between constructs, monitoring the state or status of each construct and connection, monitoring network traffic flow among the constructs and even establishing routes of network traffic by programming the constructs with routing tables.

The cloud access layer 110 may include constructs that provide network devices with access to constructs within the cloud core layer 104. Additionally, in some embodiments, the cloud access layer 110 may be understood to include the connections between constructs deployed within the cloud core 104 (e.g., the network layer 108) and network devices. Examples of network devices that access the constructs of the cloud core layer 104 include, but are not limited or restricted to, data centers (often times, "on-premise" or "on-prem" data centers), branches (e.g., corporate offices), network devices of users (e.g., laptops, desktop computers, tablets, mobile phones, internet of things (IoT) devices, etc.), etc.

In embodiments, the connections between the network devices of the cloud access layer 110 and constructs of the cloud core layer 104 may include virtual private networks (VPNs), software-defined wide area network (SD-WANs) connections, multi-protocol label switching (MPLS), broadband cellular connections (e.g., 4G, 5G), GOOGLE® Interconnect, etc. Additionally, the cloud access layer 110 may include deployment of firewalls, encryption and/or inspection of network traffic, and WAN optimization.

Figure 2:
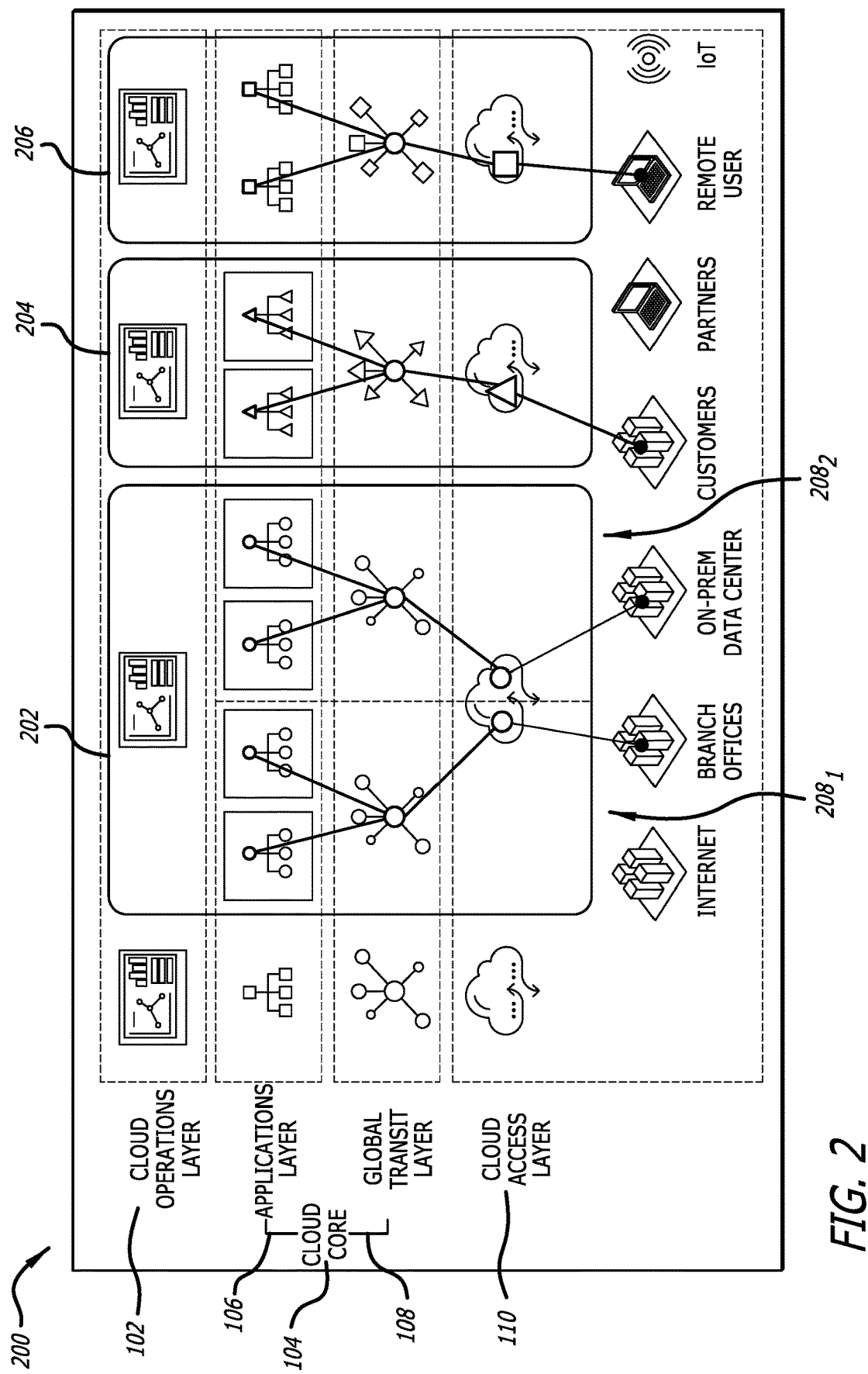
FIG. 2 is a diagram of an example embodiment of the repeatable network architecture utilized to form a client's cloud computing environment that includes multiple cloud computing environments provided by multiple cloud service providers accordance with some embodiments.

Referring now to FIG. 2, a diagram of an example embodiment of the repeatable network architecture utilized to form a client's cloud computing environment 200 that includes multiple clouds provided by multiple cloud service providers is shown in accordance with some embodiments. The diagram of FIG. 2 illustrates the repeatability of the architecture 100 implemented in creating the multi-cloud networking environment 200 with three cloud service providers (CSPs), where clouds provided by each CSP are illustrated as clouds 202, 204 and 206. In particular, constructs are deployed in each of the cloud operations layers 102, the cloud core layer 104 and the cloud access layer 110 thereby creating a portion of the cloud environment 200 within each of the cloud 202 provided by a first CSP, the cloud 204 provided by a second CSP and the cloud 206 provided by a third CSP. Examples of constructs that are configured for deployment within each of the layers 102, 104 and 110 are discussed below.

FIG. 2 illustrates that a portion of the architecture 100 may be repeated for multiple regions within cloud services provided by a single CSP. For example, the cloud 202 provided by a first CSP include regions 2081-2082, where the constructs within the cloud core layer 104 may be repeated in each region and where the constructs with the cloud operations layer 102 and the cloud access layer 110 are used by the constructs in both regions. It should be understood that the layered approach of the architecture 100 leads to repetition of the layers and the constructs which are or may be deployed or launched within each layer. The repetition of the architecture 100 does not require the repetition of the same configuration of constructs deployed and connections established in each deployment. Thus, as shown in at least FIGS. 5-6B, the layered approach of the architecture 100 is repeatedly in developing a multi-cloud network architecture that spans multiple clouds and/or multiple regions within a single cloud.

III. Network Architecture Platform

Figure 3:
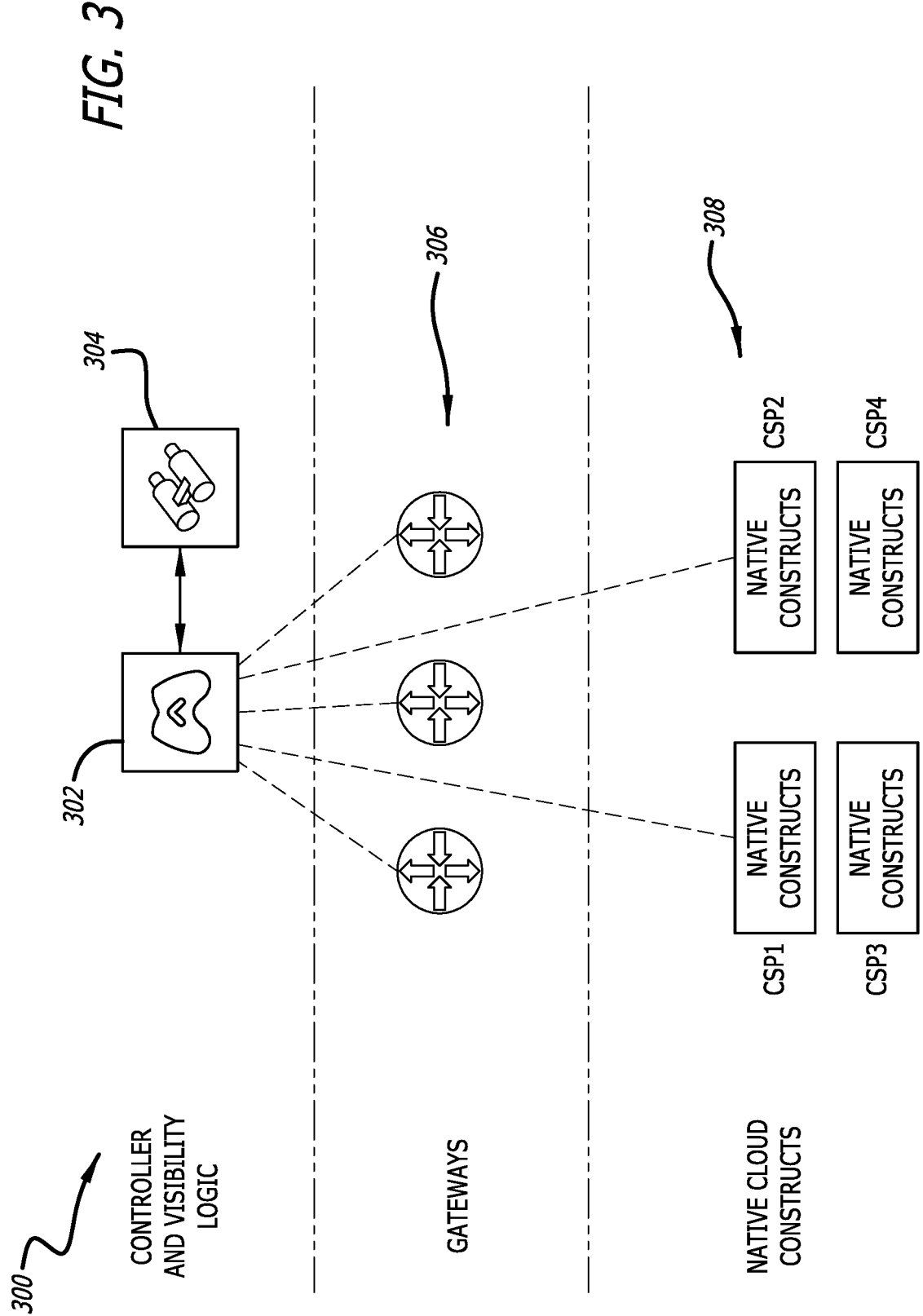
FIG. 3 is an illustration of an example embodiment of a network architecture platform that may be utilized to implement the repeatable network architecture of FIG. 1 in accordance with some embodiments.

Referring to FIG. 3, an illustration of an example embodiment of a network architecture platform that may be utilized to implement the repeatable network architecture of FIG. 1 is shown in accordance with some embodiments. The network architecture platform (platform) 300 is one embodiment of a network architecture platform that may be utilized to implement the architecture 100. As shown, the platform 300 includes a controller 302 and visibility logic 304, which are configured to be deployed and operate within the cloud operations layer 102, and one or more gateways 306 that are configured to be deployed and operate in the cloud core layer 104.

In one embodiment, the visibility logic 304 may query the controller 302 for data indicating a status and metadata of each construct managed by the controller 302 and also receive network data from one or more gateways 306 (spoke or transit). The visibility logic 304 includes logic that, upon execution by one or more processors (e.g., being part of the cloud computing resources), generates various visualizations that are a combination of the construct status and metadata (collectively "construct metadata") and the network data. The visualizations may be interactive and provided to users such as network administrators, information technology (IT) professionals, or the like. Additionally, the visualizations may be configured to receive user input, which causes the logic of the visibility logic 304 ("topology system logic") to alter the visualizations. As discussed below and illustrated in the accompanying drawings, the visualizations may include, but are not limited or restricted to, a dashboard view providing overall status and health of the network as well as specific network parameters; a dynamic topology mapping that provides a visual rendering of each construct and links that identify communications between the constructs; and a network flow visualization providing various illustrations detailing how network traffic is flowing (or has flowed) through a cloud computing environment managed by the controller 302. Each of the visualizations may provide data spanning a multi-cloud network. Further detail regarding the visibility logic 304 may be found in U.S. patent application Ser. No. 17/006,657, titled "System and Method for Determination of Network Operation Metrics and Generation of Network Operation Metrics Visualizations," filed Aug. 28, 2020, the entire contents of which are incorporated herein by reference.

In some embodiments, one or more gateways 306 may also be configured to be deployed and operate in the cloud access layer 110, for example, at a datacenter. The platform 300 may be configured to deploy (or launch) and monitor constructs 308 provided directly by a cloud service provider (referred to as native constructs), wherein the deployment and monitoring may be accomplished through the use of one or more APIs. In some embodiments, the controller 302 and the gateways 306 are deployed as a software instance operating on cloud services provided by one or more CSPs. As used herein, the term "construct" may generally refer to a controller, gateways, virtual private clouds (VPCs) (or the equivalent based on CSP, which may include MICROSOFT® AZURE virtual networks (VNETs), GOOGLE® CLOUD PLATFORM VPCs, AMAZON WEB SERVICES (AWS)® VPCs, ORACLE CLOUD INFRASTRUCTURE (OCI) virtual cloud networks (VCNs), etc.), firewalls, etc.

In some embodiments, a single instance of the controller 302 may be deployed in a client's cloud computing environment, where the single instance operates on computing resources of a single CSP. However, the controller 302 is configured to access the computing resources of all CSPs that are to provide such for the client's computing environment.

As an illustrative example, a client's cloud computing environment may consist of computing resources provided by three separate CSPs. In such an example, an instance of the controller 302 may be deployed within a cloud provided by a first CSP (first cloud) and, receive as user input, authentication credentials to access the clouds provided by the second and third CSPs (second and third clouds, respectively). As a result, the controller 302 that is deployed within the first cloud may deploy and monitor gateways 306 and native constructs 308 within the first cloud as well as the second and third clouds.

Figure 4:
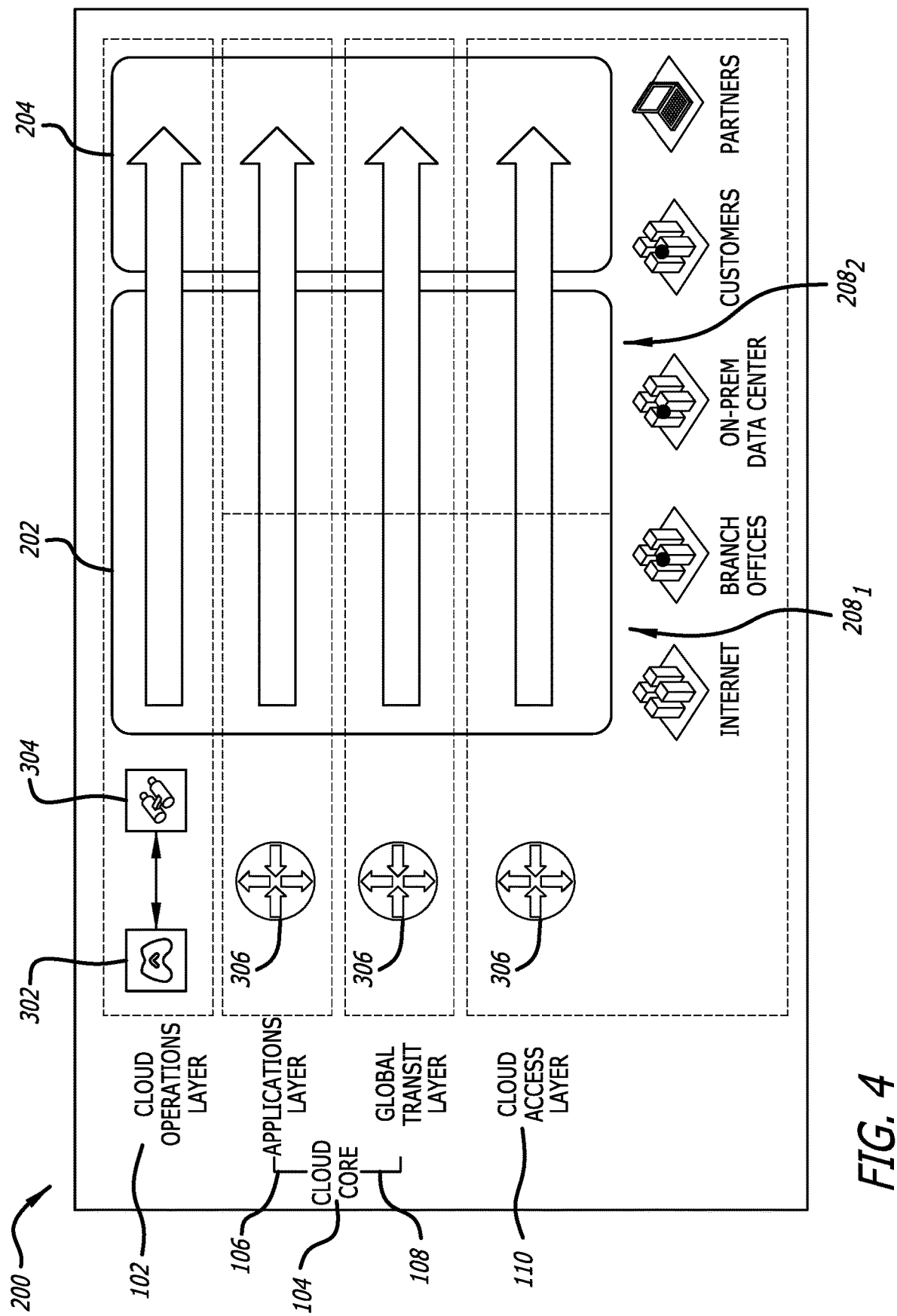
FIG. 4 is a diagram of the network architecture platform of FIG. 3 provided as an overlay to the client's cloud computing environment of FIG. 2 in accordance with some embodiments.

Referring to FIG. 4, a diagram of the network architecture platform of FIG. 3 provided as an overlay to the client's cloud computing environment of FIG. 2 is shown in accordance with some embodiments. The diagram of FIG. 4 provides an abstract illustration of components of the platform 300 implemented in the appropriate layer. As seen, the controller 302 and the visibility logic 304 are deployed in the cloud operations layer 102 and gateways 304 are deployed in both of the global transit layer 108 of the cloud core layer 104 and the cloud access layer 110.

As will be described in detail below, in implementing the architecture 100 to develop a cloud computing environment comprising clouds of multiple CSPs, an instance of the controller 302 and an instance of the visibility logic 304 may be deployed within a cloud of a first CSP, where the controller 302 is configured to access the clouds of each CSP within the cloud computing environment to deploy and monitor constructs therein. The controller 302 and the visibility logic 304 thereby form the cloud operations layer 102 of the architecture 100.

The gateways 304 and the native constructs 306 deployed by the controller 302 as well as the connections established therebetween form the cloud core layer 104. In some embodiments, as illustrated in at least FIGS. 5-6B, the gateways 304 and the native constructs 306 may be deployed in clouds provided by multiple CSPs. Additionally, the controller 302 may deploy one or more gateways 304 within the cloud access layer 110, e.g., at a remote datacenter.

Figure 5:
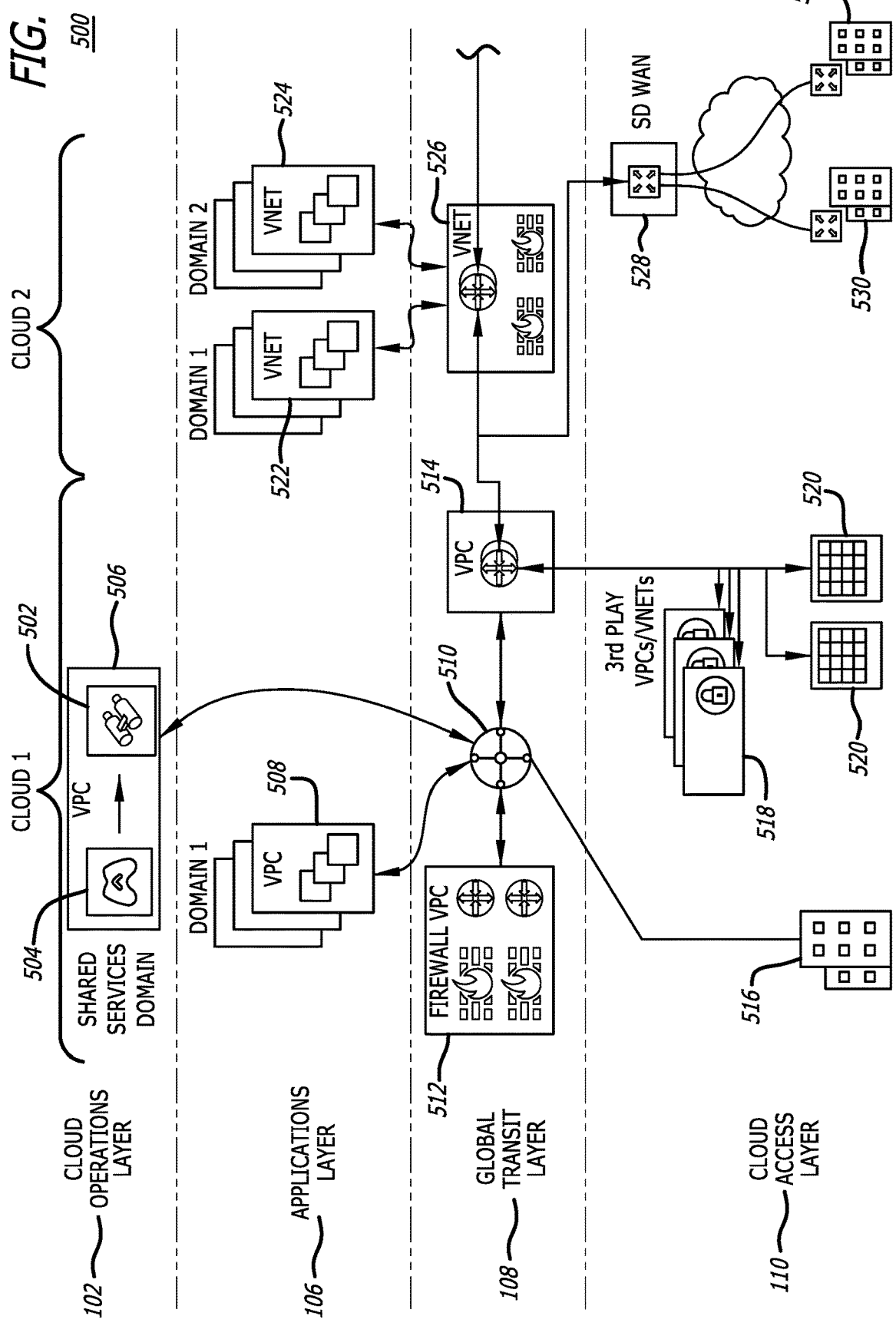
FIG. 5 is an illustration of an example cloud computing environment implemented with the network architecture platform of FIG. 3 in accordance with some embodiments.

IV. Implementation of the Repeatable Network Architecture using a Network Architecture Platform Referring now to FIG. 5, an illustration of an example cloud computing environment implemented with the network architecture platform of FIG. 3 is shown in accordance with some embodiments. The example cloud computing environment 500 (environment 500) is developed by implementing the architecture 100 with the platform 300, each discussed above. FIG. 5 illustrates the environment 500 with the layers of the architecture 100 overlayed thereon. Thus, FIG. 5 illustrates that the environment 500 includes a plurality of constructs deployed within the layers of the architecture 100. Further, the example environment 500 spans multiple (three) clouds with the architecture 100 being repeated in each cloud, e.g., the same layering configuration is utilized in each cloud while the constructs deployed in each may differ.

In particular, the example environment 500 spans multiple clouds, e.g., a first cloud provided by a first CSP and a second cloud provided by a second CSP. Within the first cloud, a controller 502 and visibility logic 504 are deployed within the cloud operations layer 102, and specifically, within the VPC 506, which is labeled "shared services domain." As used herein, deployment of a construct such as a controller or visibility logic may occur within a virtual machine, where the term "virtual machine" may refer to a virtualized/emulation of a computer system. The term virtual machine (VM) may refer to a sandboxed virtual environment and be intended to include MICROSOFT AZURE® virtual machines, AMAZON ELASTIC COMPUTE CLOUD® (AMAZON EC2), GOOGLE CLOUD PLATFORM® compute engines, or the like. It is noted that not every instance of a virtual machine is illustrated in the drawings for purposes of clarity.

Returning to FIG. 5, the first cloud (cloud 1) further includes the VPC 508 that is deployed within the applications layer 106, where the VPCs 508 represents a second domain (or secure partitioned area of the first cloud), labeled "domain 1." A plurality of VPCs each including one or more VMs may be deployed or launched within domain 1, where the network traffic entering and exiting the VPCs 508 is monitored by the controller 502. Spoke gateways may be deployed within the VPCs 506, 508 as well as 522, 524 (discussed below) but are not shown for purposes of clarity.

Within the global transit layer 108, the first cloud includes a gateway 510, a VPC 512 labeled "firewall VPC" and a second VPC 514. As shown, the firewall VPC 512 may include one or more gateways and one or more firewalls, where the firewall VPC 512 may be configured to inspect network traffic propagating through the first cloud. Further detail of the firewall VPC 512 may be found in U.S. patent application Ser. No. 17/216,601, titled "Systems and Methods for Load Balancing Network Traffic at Firewalls Deployed in a Cloud Computing Environment," filed Mar. 29, 2021, the entire contents of which are incorporated herein by reference.

As further illustrated, the gateway 510 is communicatively coupled to a datacenter 516 and the VPC 514 is communicatively coupled to branch offices 520. The method of communicatively connecting these VPCs to network devices (optionally via a gateway instance deployed thereon) may be any of the connection methods referenced herein including MICROSOFT® AZURE Express Route, GOOGLE® Cloud Interconnect, Internet Protocol Security (IPsec) tunnels, etc. The VPC 514 is also shown as being communicatively coupled with branch offices 530 via a SD-WAN connection.

The second cloud (cloud 2) includes two domains (domain 1 and domain 2) within the applications layers 106, where each domain may include one or more VNETs. The distinction between deployment of VPCs in the first cloud and VNETs in the second cloud indicates that the second cloud is provided by a second CSP different than a first CSP that is providing the first cloud. The VNET 526 is deployed within the global transit layer 108, where the VNET 526 includes two high-availability gateways each with a corresponding firewall. The VNET 526 is communicatively coupled to the branch offices 530 via the SD-WAN connection 528.

FIG. 5 illustrates that the spoke VPCs deployed in the clouds comprising a multi-cloud computing environment like the environment 500 are communicatively coupled via the global transit layer 108. Specifically, the VPC 514 of the first cloud is communicatively coupled to the VNET 526 of the second cloud via gateways deployed in each, where such is accomplished through a combination of operations performed by a controller, visibility logic and gateways (e.g., constructs forming the platform 300). Referring specifically to FIG. 5, as the controller 502 has launched and deployed the gateways within each of the VPC 514 and the VNET 526, network traffic may propagate between these constructs (and thus between clouds) while being monitored and controlled by the controller 502. Further, the VNET 526 (via the gateways deployed therein) may optionally be coupled to additional VPCs or VNETs of other clouds (not shown).

Figure 6A:
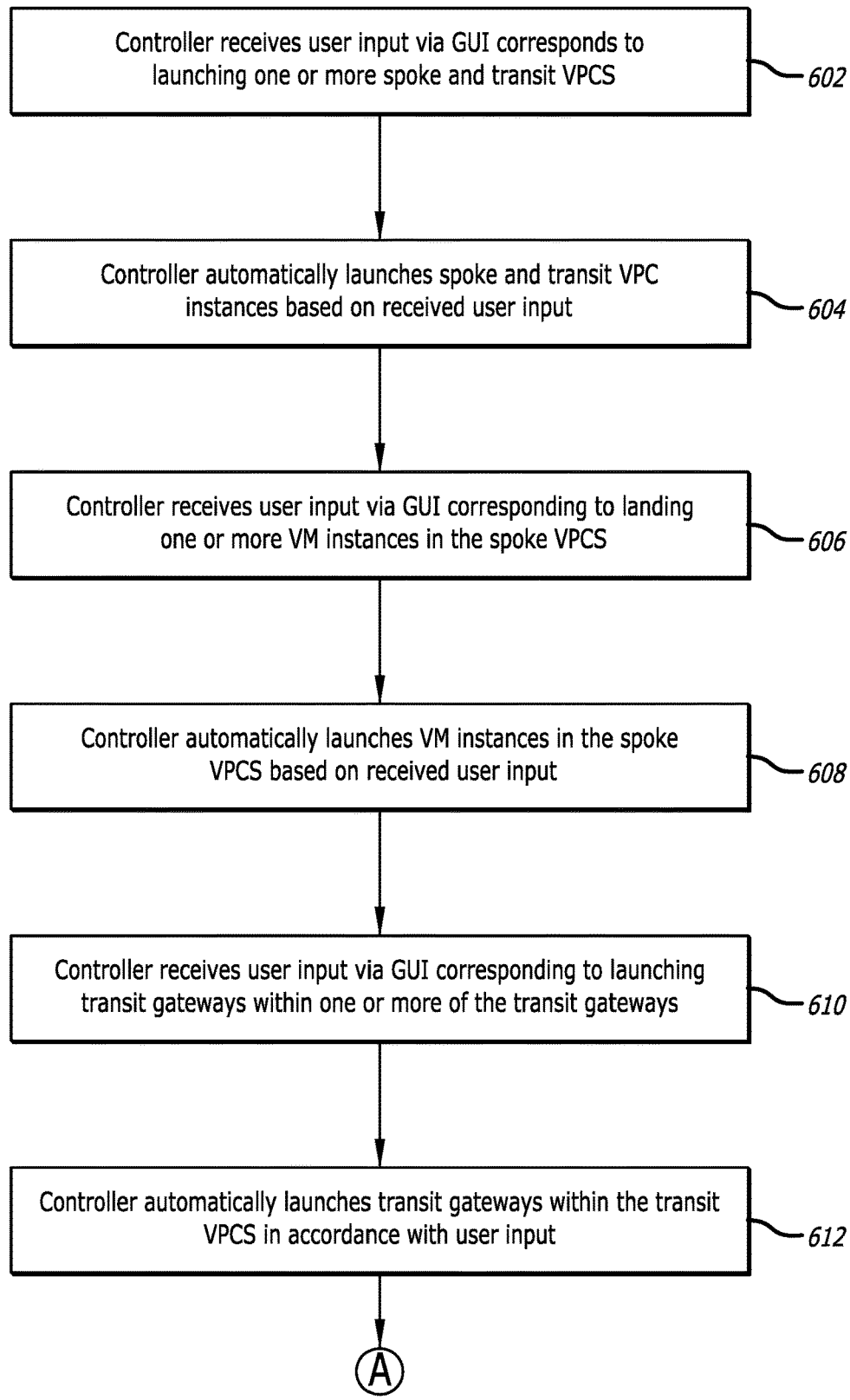
FIG. 6A is an illustration of a first portion of an example cloud computing environment implemented with the network architecture platform of FIG. 3 including an applications layer and a network layer in accordance with some embodiments.
Figure 6B:
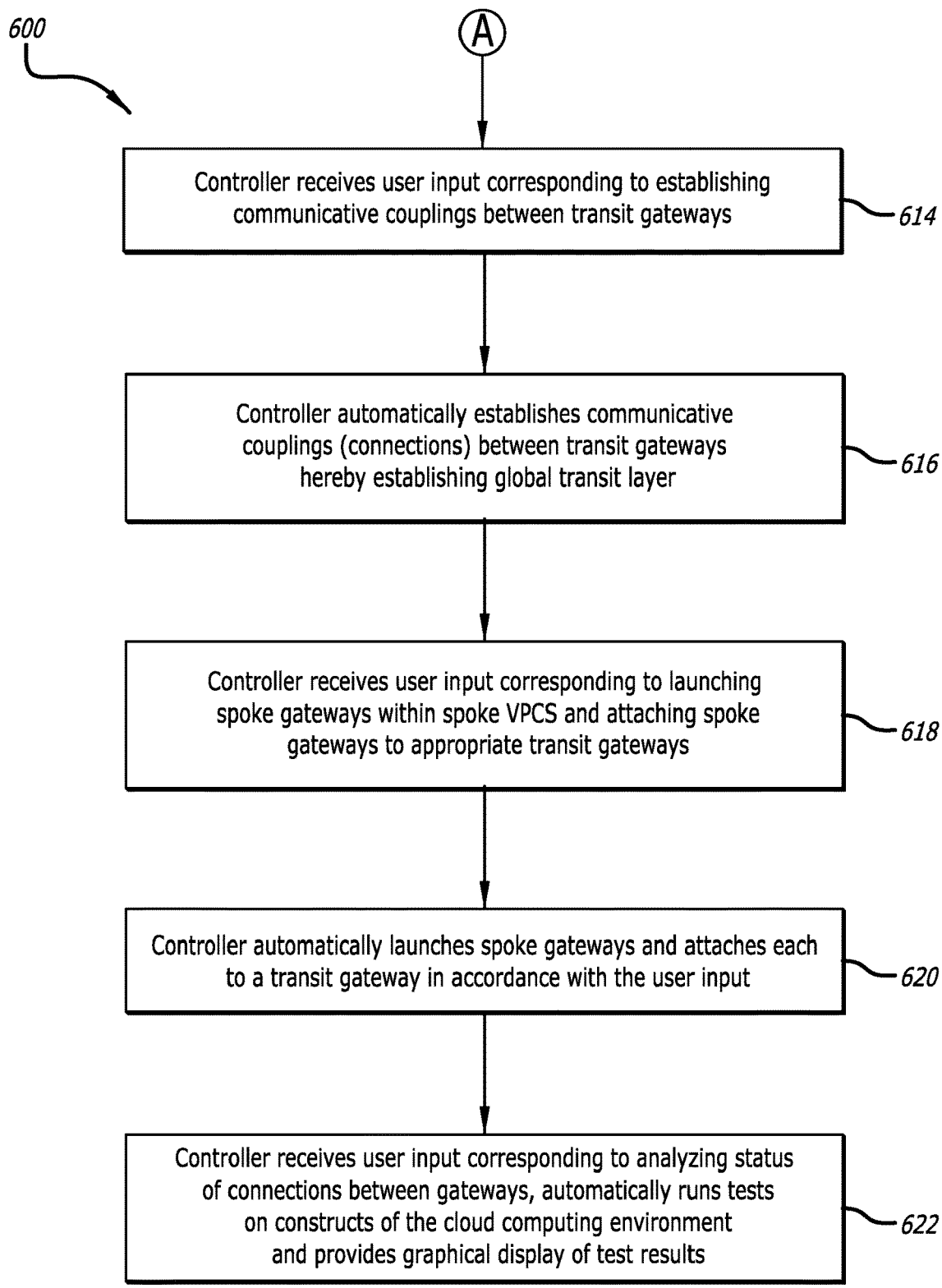
FIG. 6B is an illustration of a second portion of the example cloud computing environment of FIG. 6A implemented with the network architecture platform of FIG. 3 including the applications layer, the network layer and a cloud access layer in accordance with some embodiments.

Referring to FIGS. 6A-6B, a flowchart of a method of automatically building a cloud computing environment is shown in accordance with some embodiments. Each block illustrated in FIGS. 6A-6B represents an operation performed in the method 600 of automatically building a cloud computing environment by a controller based on received user input. Prior to the start of operations comprising the method 600, it is assumed that at least one cloud computing account has been established with a first CSP and that a controller instance has been launched and is operationally functional (e.g., processing) on computing resource of the first CSP (the first cloud). In the event multiple CSPs will be utilized in building the cloud computing environment, it is further assumed that the controller has been provided the requisite authentication information for an account with each CSP in order to access the computing resources of the CSP. The method 600 includes operations performed by the controller (e.g., logic of the controller) associated with automatic generation of a cloud computing environment, which includes launching constructs such as VPCs (both spoke and transit) and transit gateways. The method 600 also includes operations of deploying VM instances in the spoke VPCs and establishing communicative connections between transit gateways. Thus, the method 600 generally discloses operations associated with building aspects of a cloud computing environment corresponding to the applications layer 106 and the global transit layer 108 of the architecture 100.

The method 600 begins when the controller receives user input, via a GUI, corresponding to launching one or more VPCs (block 602). Thus, a first step in building the applications layer 106 and the global transit layer 108 of a cloud computing environment may be for the controller to launch one or more VPCs, where user input may provide certain parameters such as the cloud type (e.g., CSP), account name for the CSP, a VPC name, a region of the CSP in which to deploy the VPC, and a CIDR for the VPC. Additionally, the VPC type is also indicated per the user input, indicating either a spoke VPC or transit VPC. Upon receiving the user input corresponding to launch one or more VPCs, the controller automatically performs operations to launch the one or more spoke and transit VPCs in accordance with the user input (block 604). Referring briefly to FIG. 1, the spoke VPCs may be launched as part of the applications layer 106

(where the spoke VPCs may also be referred to as workload VPCs) and the transit VPCs may be launched as part of the global transit layer 108.

Referring again to FIG. 6A, the controller receives user input via a GUI corresponding to launching one or more VM instances within the spoke VPCs (block 606). Thus, a second step in building the applications layer 106 and the global transit layer 108 of a cloud computing environment may be for the controller to launch one or more VM instances in the spoke VPCs that have been launched in the applications layer 106. Applications (or processing, workloads, etc.) may process within the VM instances. Upon receiving the user input corresponding to launch one or more VM instances, the controller automatically performs operations to launch the one or more VM instances in accordance with the user input (block 608).

The method 600 continues with the controller receiving user input via a GUI corresponding to launching one or more transit gateways within the one or more transit VPCs (block 610). Thus, a third step in building the applications layer 106 and the global transit layer 108 of a cloud computing environment may be for the controller to launch one or more transit gateways, where user input may provide certain parameters such as the cloud type (e.g., CSP), account name for the CSP, a gateway name, a region of the CSP in which to deploy the gateway, a VPC identifier (ID), a public subnet, a gateway size, whether to enable a meshing feature (where primary and backup gateways are both actively used in a load balancing configuration), etc. Upon receiving the user input corresponding to launch one or more transit gateways, the controller automatically performs operations to launch the one or more transit gateways in accordance with the user input (block 612).

The controller may then receive user input via a GUI corresponding to establishing communicative couplings (connections) between transit gateways (block 614). Thus, a fourth step in building the applications layer 106 and the global transit layer 108 of a cloud computing environment may be for the controller to connect transit gateways, which may be deployed in across multiple clouds (e.g., provided by multiple CSPs). Upon receiving the user input corresponding to establish connections between transit gateways, the controller automatically performs operations to establish such connections between transit gateways in accordance with the user input (block 616). These connections allow network traffic to be propagated throughout the entire cloud computing environment. Referring briefly again to FIG. 1, the transit VPCs, transit gateways and connections therebetween may be launched as part of the global transit layer 108.

The method 600 continues with the controller receiving user input via a GUI corresponding to launching one or more spoke gateways within the one or more spoke VPCs, and attaching those spoke gateways to transit gateways. This establishes a communicative coupling between spoke VPCs and transit VPCs, e.g., connecting constructs of the applications layer 106 to those of the global transit layer 108 (block 618). Thus, a fifth step in building the applications layer 106 and the global transit layer 108 of a cloud computing environment may be for the controller to launch one or more spoke gateways, where user input may provide the parameters described above with respect to transmit gateways (blocks 610-612). The user input may provide additional parameters pertaining to establishing the connections between spoke and transit gateways including a spoke gateway name and a transit gateway name between which a connection is to be established. Upon receiving the user input corresponding to launching one or more spoke gateways and attaching those spoke gateways to transit gateways, the controller automatically performs operations to launch the one or more spoke gateways and attached the spoke gateways to transit gateways in accordance with the user input (block 620).

Additionally, as a set of optional operations, the controller may receive user input corresponding to analyzing the status of connections between gateways (e.g., spoke to spoke via one or more transit gateways), automatically run one or more tests on constructs of the cloud computing environment and provide a graphical display of the test results (block 622). In one example, the tests may be a "ping" communication sent from a first spoke gateway to a second spoke gateway and the results may include a confirm that a route exists between the two spoke gateways and a latency of the route. Another example of a test may be a "trace route," which includes a transmission sent from a first spoke gateway to a second spoke gateway and the results indicating a number of "hops" (e.g., gateways through which the communication was routed) and a listing of those hops.

Figure 7A:
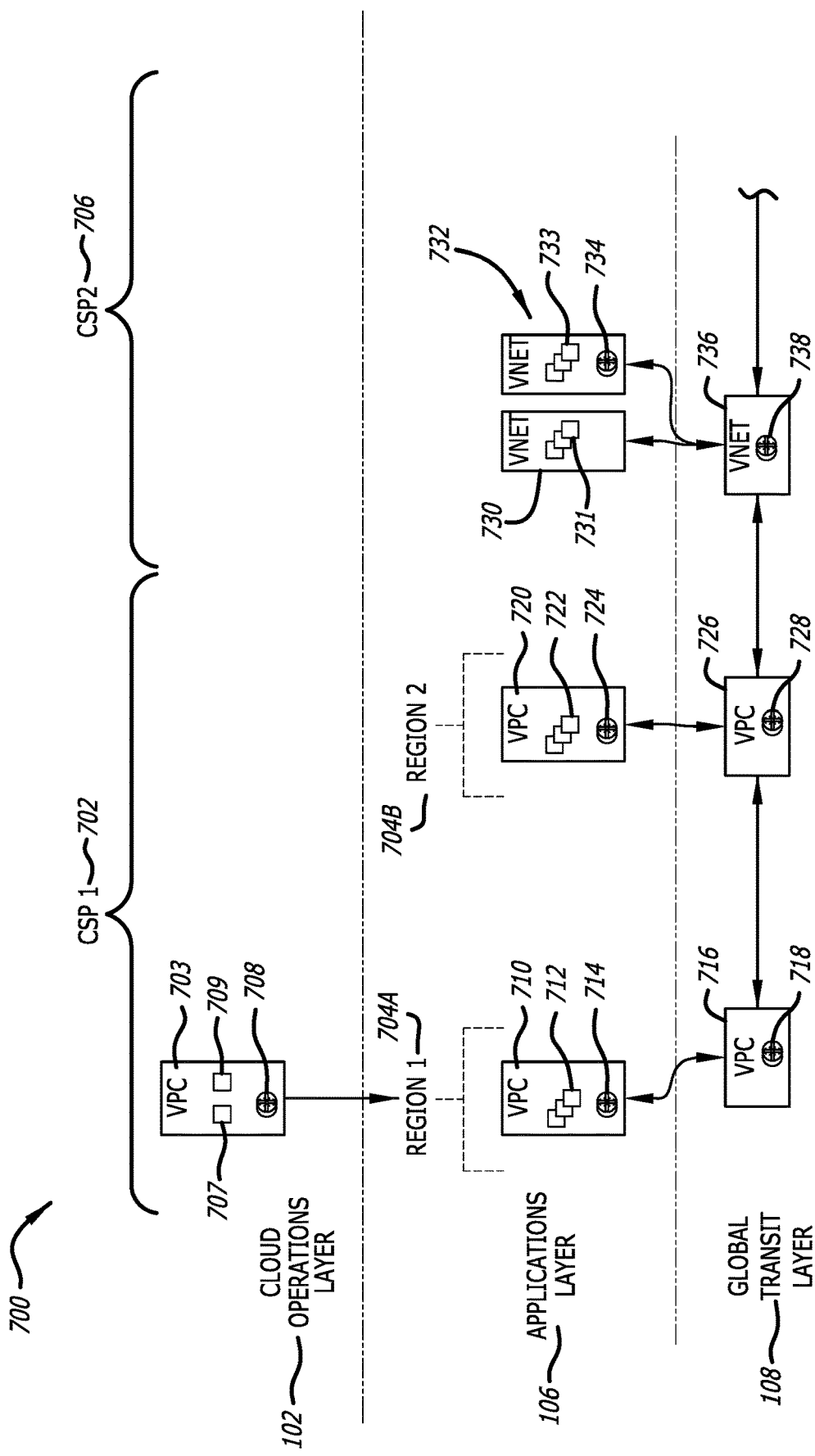
FIGS. 7A-7B are illustrations of a first portion of an example cloud computing environment implemented with the network architecture platform of FIG. 3 including an applications layer and a network layer each of FIG. 1 in accordance with some embodiments.
Figure 7B:
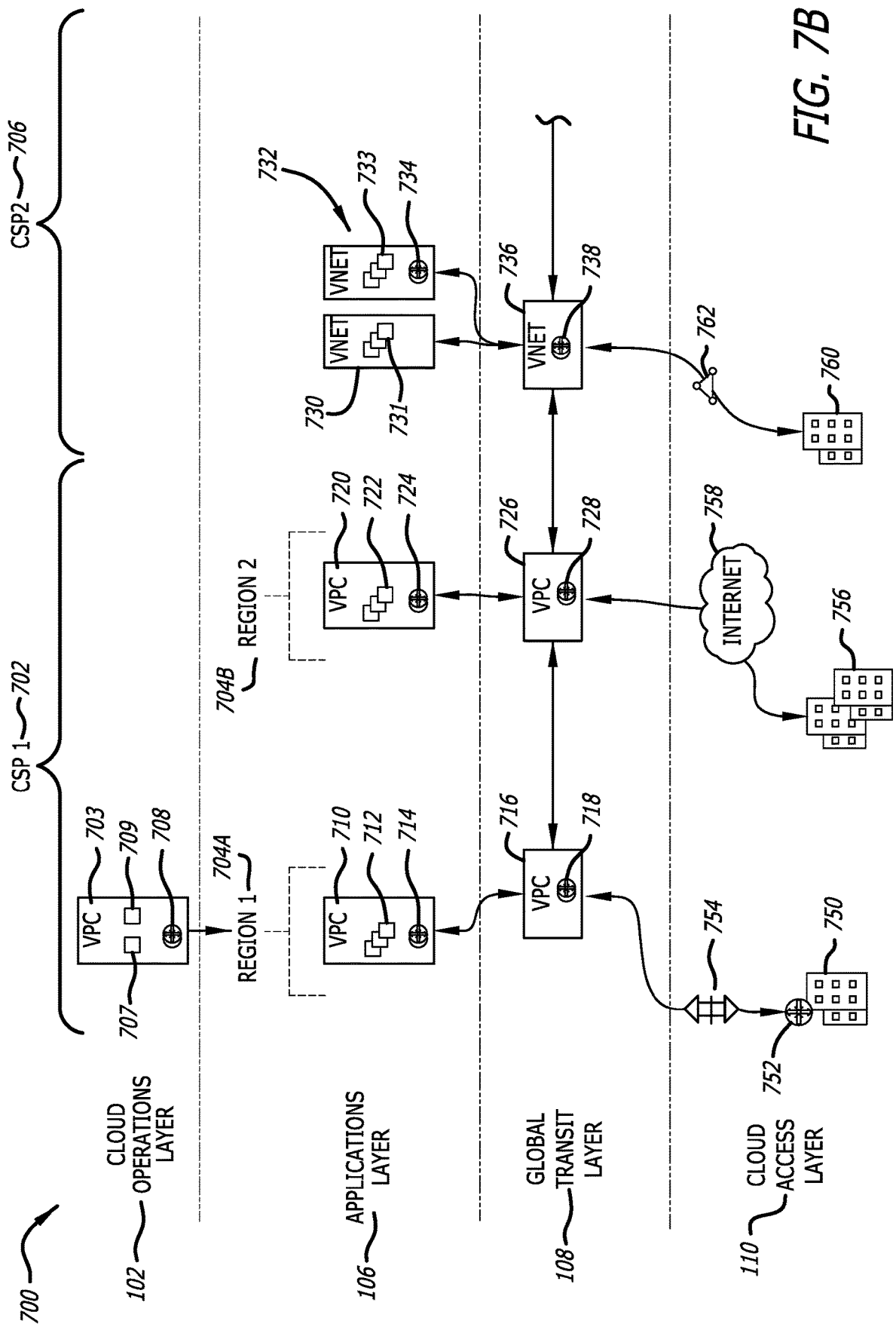

Referring to FIG. 7A, an illustration of a first portion of an example cloud computing environment implemented with the network architecture platform of FIG. 3 including an applications layer and a network layer each of FIG. 1 is shown in accordance with some embodiments. FIG. 7A illustrates a portion of an exemplary cloud computing environment 700 that has been developed through implementation of the architecture 100; FIG. 7B illustrates additional aspects of the cloud computing environment 700. FIG. 7A illustrates the deployed constructs situated in either the applications layer 106 or the global transit layer 108.

The cloud computing environment 700 is shown to span clouds provided by two separate CSPs, namely cloud 702 provided by CSP-1, which includes regions 704A and 704B and cloud 706 provided by CSP-2. FIG. 7A also illustrates that the VNET 736 may be connected to additional VPCs (or VNETs), which may be deployed in clouds provided by additional CSPs. Thus, the disclosure is not intended to limit the use of the architecture 100 to two clouds (e.g., provided by two separate CSPs). Instead, the architecture 100 may be utilized to build a cloud computing environment spanning any number of clouds where the constructs of each cloud are communicatively connected within the global transit layer 108.

In some embodiments, the environment 700 is built automatically by the controller 707 based on user input that may be received via a GUI. One illustrative embodiment of such a methodology is illustrated in FIGS. 6A-6B and discussed above. The discussion of FIGS. 7A-7B may refer to the operations of method 600, particularly with respect to generation (or building) of the environment 700. As illustrated, the controller 707 is operating within a VM (not shown) of the VPC 703, which is deployed within the cloud operations layer 102 utilizing the cloud computing resources of CSP 1 702. The VPC 703 also includes visibility logic, which may be operating within a VM (not shown) of the VPC 703. Further, spoke gateways 708 may be deployed within the VPC 703 in an active-active configuration.

In one exemplary embodiment, the environment 700 is built by the controller 707 based on user input. For example, following establishment of user access accounts with CSP-1 and CSP-2 (and optionally other CSPs), the controller 707 receives authentication information and is configured to access computing resources associated with these accounts. Subsequently, the controller 707 may receive user input indicating spoke VPCs and transit VPCs to be deployed. As a result, the controller 707 deploys the spoke VPCs 710, 720 and the transit VPCs 716, 726 in a first cloud 702 provided by CSP-1. Specifically, based on the user input, the spoke VPC 710 and the transit VPC 716 are deployed (or launched) in a first region 704A (region 1) and the spoke VPC 720 and the transit VPC 726 are deployed (or launched) in a second region 704B (region 2). Additionally, the controller 707 deploys the spoke VNETs 730, 732 and the transit VNET 736 in a second cloud 706 provided by CSP-2.

Based on further user input, the controller 707 deploys one or more VM instances (VM instances) 612 in the spoke VPC 610, VM instances 622 in the spoke VPC 620, VM instances 631 in the VNET 630 and VM instances 633 in the VNET 632. Further, the controller 707 launches the transit gateways 718 in the transit VPC 716, the transit gateways 728 in the transit VPC 726 and the transit gateways 738 in the transit VPC 736. Additionally, the controller 707 launches the spoke gateways 714 in the spoke VPC 710, the spoke gateways 724 in the spoke VPC 720 and the spoke gateways 734 in the spoke VPC 732.

Following launching of the spoke and transit VPCs, the VM instances within the spoke VPCs and the spoke and transit gateways, the controller 707 performs operations to establish communicative connections between: (i) the spoke gateway 714 and the transit gateway 718; (ii) the spoke gateway 724 and the transit gateway 728; (iii) the spoke gateway 714 and the transit gateway 718; (iv) the transit gateway 718 and the transit gateway 728; and (v) the transit gateway 728 and the transit gateway 738. Upon establishing such connections, the controller 707 has built the environment 700 in accordance with user input while implementing the architecture 100.

Referring now to FIG. 7B, an illustration of a second portion of the example cloud computing environment of FIG. 7A implemented with the network architecture platform of FIG. 3 including the applications layer, the network layer and a cloud access layer is shown in accordance with some embodiments. The environment 700 of FIG. 7A is shown as including constructs deployed within the cloud access layer 108. For example, FIG. 7B illustrates that the controller 707 may provide access to the computing services of the environment 700 by establishing a connection between the first cloud 602 and the server/network devices of branch offices (or other remote location) 650. In some embodiments, the connection may be an AWS® Direct Connect circuit between the transit gateway 718 and the spoke gateway 652 deployed on the server/network devices of the branch offices 650. Similarly, the controller 707 may provide the data center 656 with access to the environment 700 by establishing a connection via the internet between the transit gateway 728 and the data center 656. Further, the controller 707 may provide the data center 660 with access to the environment 700 by establishing a connection between the transit gateway 728 and the data center 656, where, in some embodiments, the connection may be an AZURE® ExpressRoute.

Figure 8A:
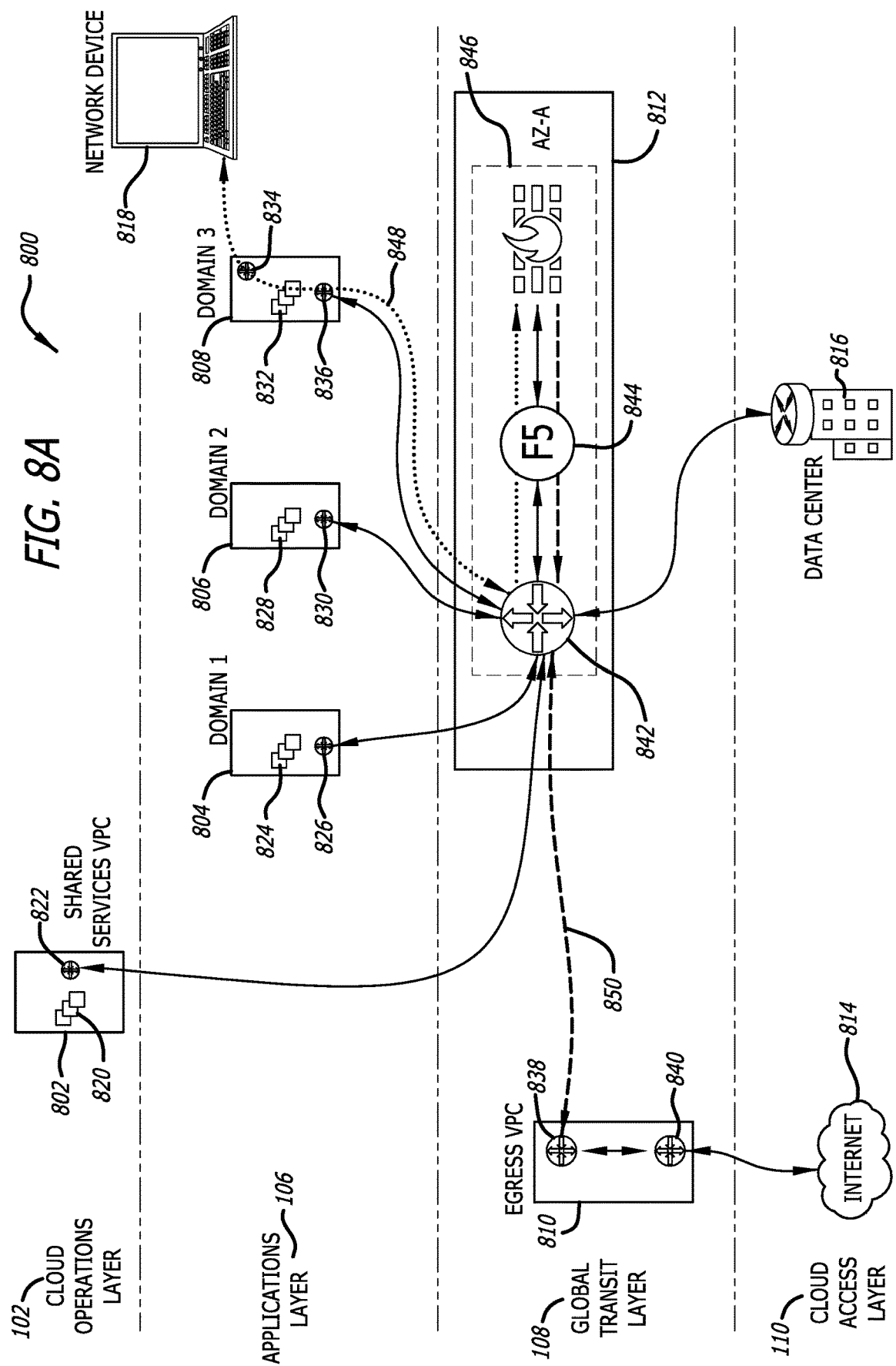
FIGS. 8A-8B are illustrations of example cloud computing environments implemented with the network architecture platform of FIG. 3 including service constructs in accordance with some embodiments.
Figure 8B:
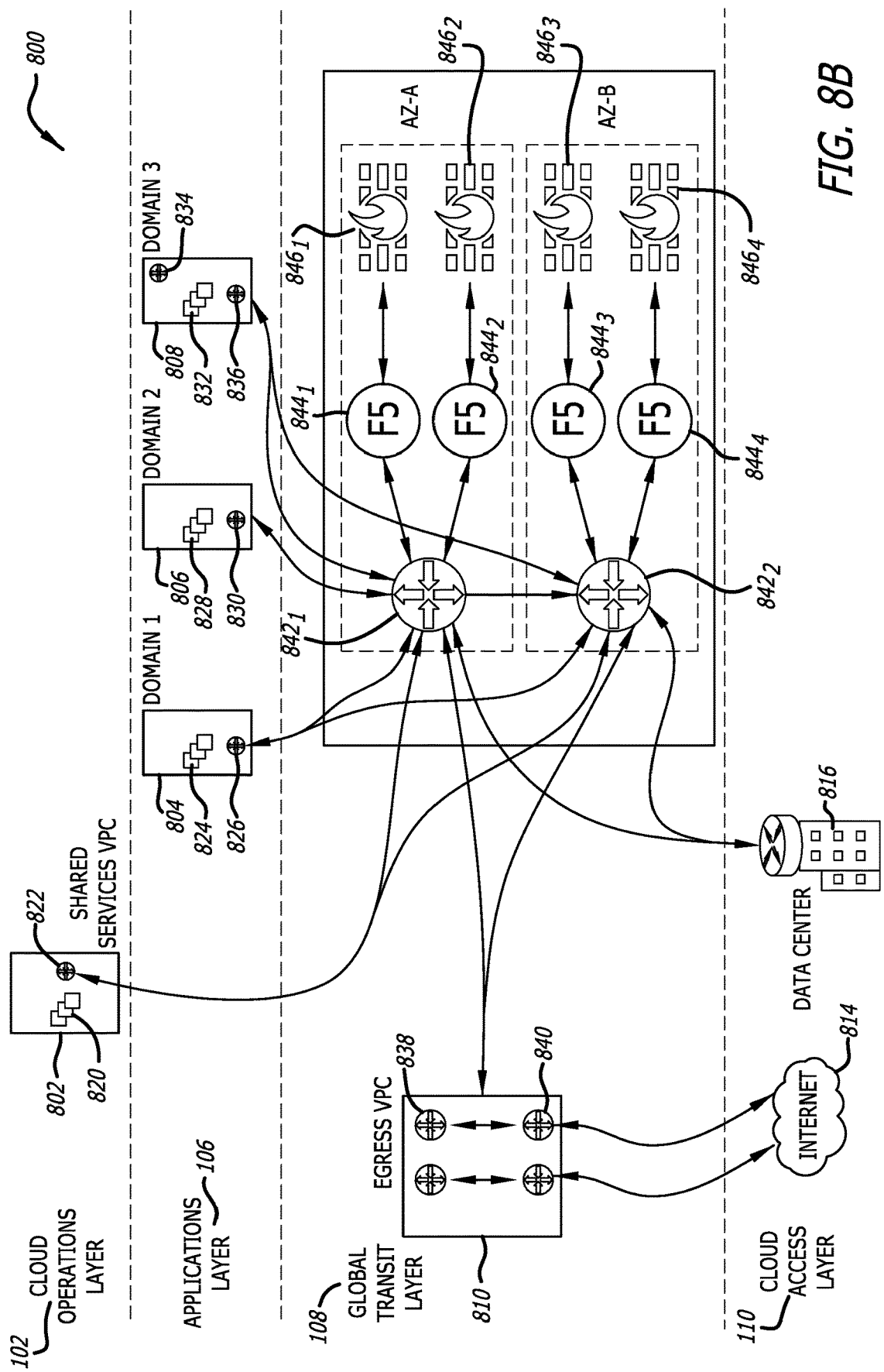

Referring to FIGS. 8A-8B, illustrations of example cloud computing environments implemented with the network architecture platform of FIG. 3 including service constructs are shown in accordance with some embodiments. Referring specifically to FIG. 8A, the cloud computing environment 800 is similar to environments 500 and 700 in that the environment 800 is an environment constructed through implementation of the architecture 100 through the inclusion of a cloud operations layer 102, an applications layer 106, a global transit layer 108 and a cloud access layer 110. Further, the cloud operations layer 102 of the environment includes a "shared services" VPC 802 that includes deployment of VM instances 820 (in which a controller and visibility logic are deployed and operating) and a spoke gateway 822.

The applications layer 106 of the environment 800 includes a plurality of spoke gateways 804, 806 and 80, where each includes a set of VM instances 824, 828, 823 and a spoke gateway 826, 830, 836, respectively. Additionally, the global transit layer 108 of the environment 800 includes transit VPCs 810, 812. The transit VPC 810 may be referred to as an egress VPC) that includes gateways 838, 840 and transmit traffic from the environment out to the internet 814 (within the cloud access layer 110). The transit VPC 812 includes the gateway 842 that is coupled to a F5® SSL ORCHESTRATOR® ("Orchestrator") 844, which is coupled to a firewall instance 846. The ORCHESTRATOR® 844 may be configured to decrypt and/or encrypt network traffic passing therethrough, where encrypted network traffic 848 may be passed from a network device 818 through the ORCHESTRATOR® 844, which decrypts and passes the network traffic to the firewall instance 846 for inspection. The inspected network traffic is then encrypted (network traffic 850) as it passes through the ORCHESTRATOR® 844 while propagating to the internet via the egress VPC 810.

As an alternative to transmitting network traffic from the transit VPC 842 to the internet 814 by way of the egress VPC 810, network traffic may be directed to a data center 816 (where a spoke gateway may be deployed). Thus, FIG. 8A illustrates one embodiment in which third-party services, e.g., an F5® SSL ORCHESTRATOR®, may be inserted into the global transit layer 108 of an environment constructed in accordance with the architecture 100.

Referring now to FIG. 8B, an alternative embodiment of the cloud computing environment 800 is shown in which the transit VPC 812 includes transit gateways 8421-8422 deployed in an active-active configuration such that network traffic may be passed back and forth. Additionally, the transit gateways 8421-8422 may each be connected to ORCHESTRATOR® instances 8441-8444, which are in turn coupled to firewall instances 8461-8464. In some embodiments, load balancing operations may be performed with network traffic that may be passed to the firewall instances 8461-8464 for inspection.

Figure 9A:
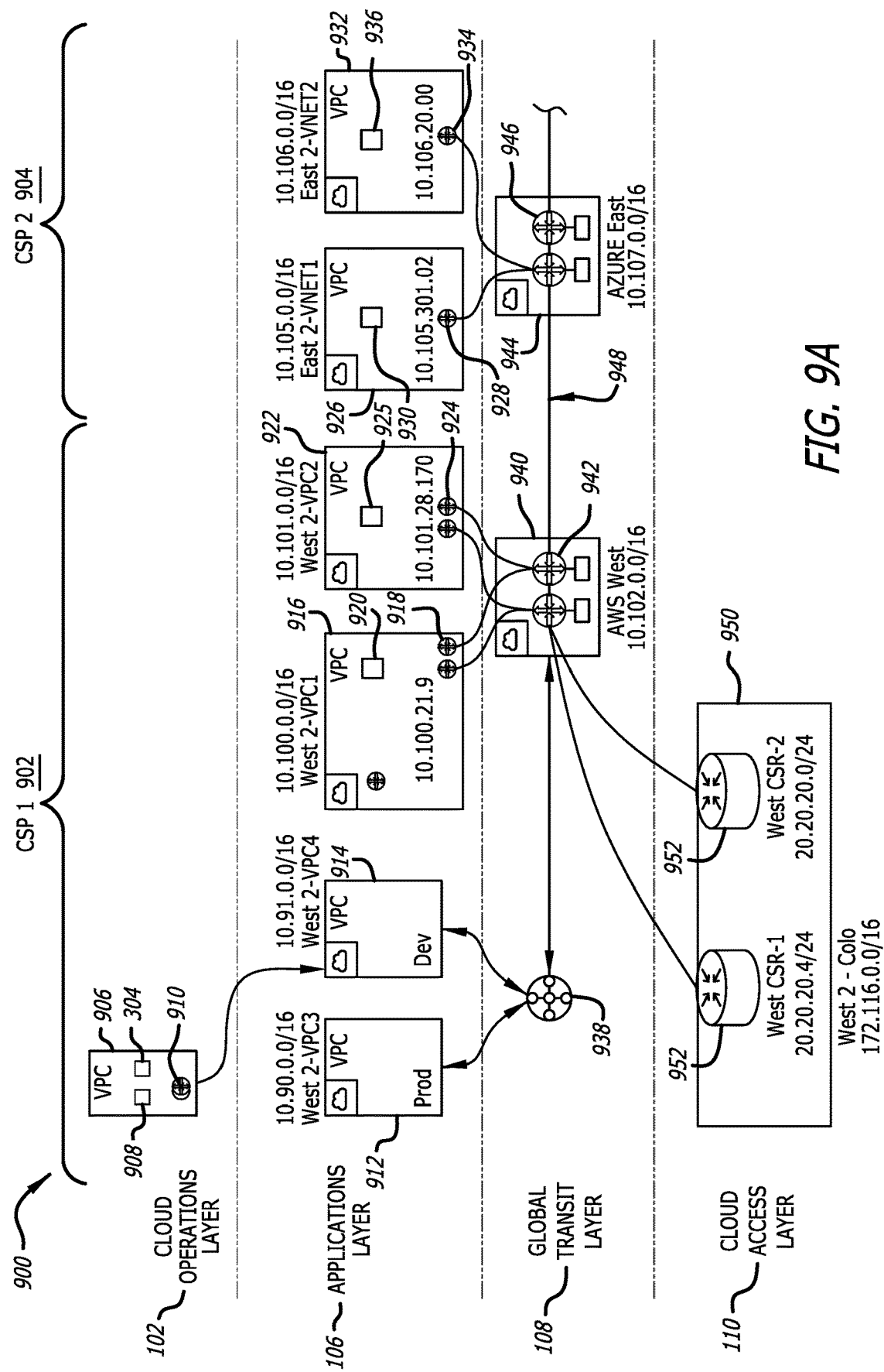
FIG. 9A is an illustration of an example cloud computing environment implemented with the network architecture platform of FIG. 3 including an applications layer and a network layer each of FIG. 1 in accordance with some embodiments.

Referring now to FIG. 9A, an illustration of an example cloud computing environment implemented with the network architecture platform of FIG. 3 including an applications layer and a network layer each of FIG. 1 is shown in accordance with some embodiments. The example cloud computing environment 900 (environment 900) includes a plurality of regions from a single CSP: Region 1 902 and Region 2 904; however, as indicated in other figures and discussed above (e.g., see FIG. 7A-7B), the disclosure generally, including the embodiment of FIG. 9A, is not limited to a single CSP. Thus, based on the disclosure throughout, including the description accompanying at least FIGS. 7A-7B, it should be understood that the embodiment of FIG. 9A may extend to multiple CSPs.

Figure 9B:
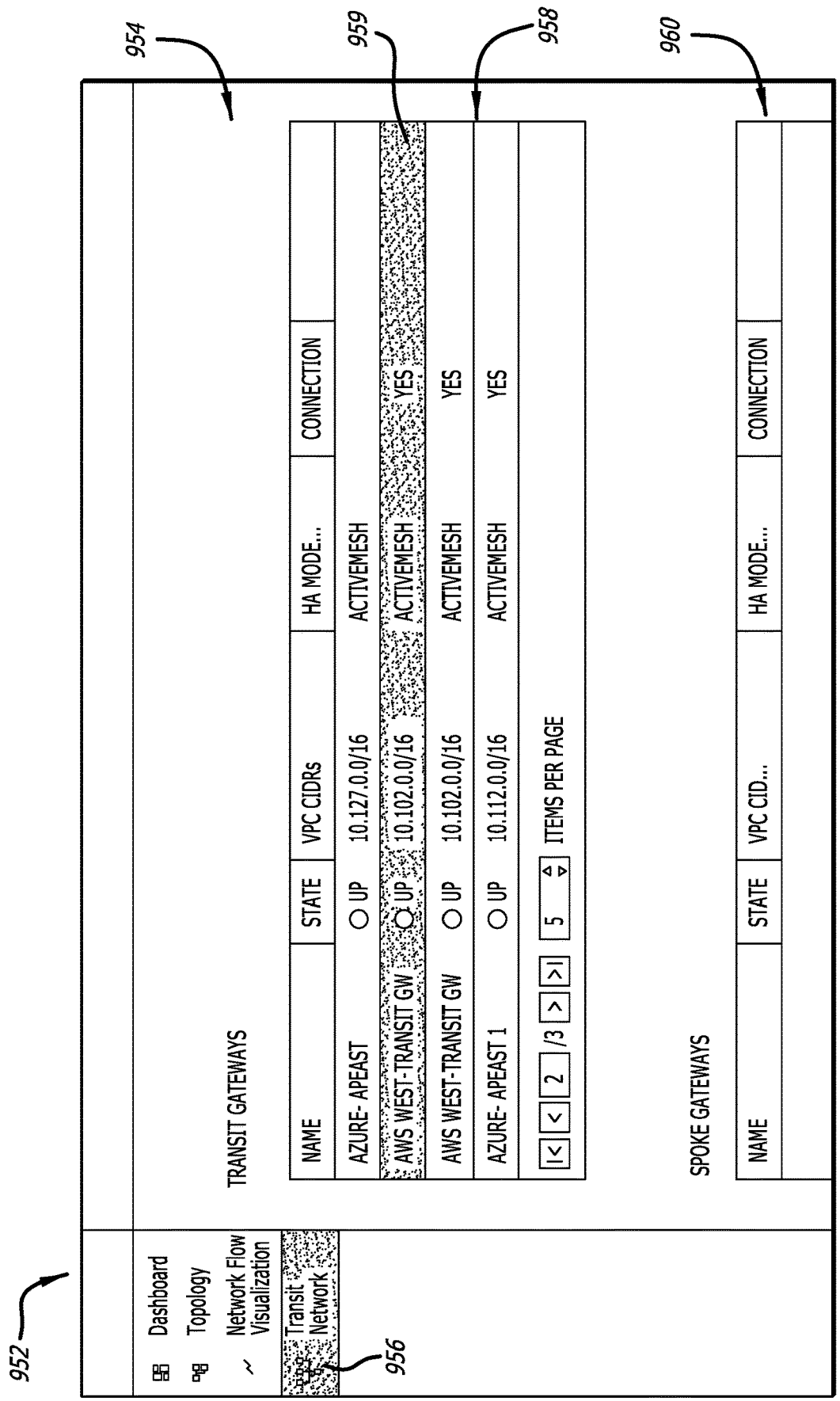

FIG. 9A illustrates a portion of environment 900 that has been developed through implementation of the architecture 100; FIGS. 9B-9D illustrate visualizations accessible via the controller 908 and/or the visibility logic 304. For example, the visualizations may be accessible by a network administrator through a web browser and/or a dedicated application interface ("app") that operates, at least partially, on a network device of the administrator.

The cloud computing environment 900 is shown to include a cloud that spans two regions, namely region 1 902 and region 2 904 provided by CSP-1; not shown are optional additional clouds provided by other CSPs that may be communicatively coupled to the illustrated network constructs at least via the global transit layer 108 (see fragmented connection line). As noted, the disclosure is not intended to limit the use of the architecture 100 to any number of clouds (e.g., provided by one or more CSPs). Instead, the architecture 100 may be utilized to build a cloud computing environment spanning any number of clouds where the constructs of each cloud are communicatively connected within the global transit layer 108.

In some embodiments, the environment 900 is built automatically by the controller 908 (deployed in the VPC 906, alongside the visibility logic 304, where the VPC 906 may include the spoke gateway(s) 910) based on user input that may be received via a GUI. One illustrative embodiment of such a methodology is illustrated in FIGS. 6A-6B and discussed above. The generation of the environment 900 may be similar to that of the environment 700 discussed above, albeit with different network constructs. FIG. 9A includes additional details such as network address information (e.g., IP addresses and/or CIDRs) of a plurality of the network constructs. For instance, the VPCs 912, 914 deployed may have the CIDRs of 10.90.0.0/16, 10.91.0.0/16, respectively. Similarly, the VPCs 916, 922 may have the CIDRs of 10.100.0.0/16, 10.101.0.0/16, respectively. Further, the VPCs 926, 932 may have the CIDRs of 10.105.0.0/16, 10.106.0.0/16, respectively.

As discussed above, the controller 908 is configured to deploy the majority, if not all, of the network constructs shown in FIG. 9A and thus has visibility as to the network address information (hereinafter, generally "CIDRs" for clarity) of each network construct. For instance, the controller 908 may maintain a listing of all transit gateways deployed within the environment 900 (see FIG. 9B) and generate various visualizations display details of the transit gateways, associated connections and other network constructs (see FIGS. 9B-9D). As noted below, the visualizations may alternatively be generated by the visibility logic 304 and/or the visualizations may be generated by the combination of the controller 908 and the visibility logic 304.

More specifically, the controller 908 may be configured to obtain routing information (also referred to as "learning" routes or routing information) pertaining to the propagation of network traffic through the environment 900. As the controller 908 learns routing information from one construct, e.g., the transit gateway 942, such may be propagated to network constructs, e.g., the controller 908 may program the routing tables of network constructs to include routing information learned from another network construct. In some embodiments, the controller 908 may learn routing information from spoke or transit gateways and/or from native constructs (such as AWS® transit gateways, e.g., the gateway 938).

For instance, as the controller 908 monitors network traffic flow throughout the environment 900, with may include obtaining data from the visibility logic 304. For example, the controller 908 may maintain construct metadata, which may include, but is not limited or restricted to one or more of the following construct parameters (properties) for each construct: construct name, construct identifier, encryption enabled, properties of the VPC associated with that construct (e.g., VPC name, identifier and/or region, etc.), cloud properties in which the construct is deployed (e.g., cloud vendor in which the construct resides, cloud type, etc.), or the like. Additionally, the visibility logic 304 may query certain network constructs, such as gateways, via APIs calls to obtain network data (e.g., for each network packet, but is not limited or restricted to, an ingress interface, a source IP address, a destination IP address, an IP protocol, a source port for UDP or TCP, a destination port for UDP or TCP, a type and code for ICMP, an IP "Type of Service," etc.). Additional detail regarding obtaining construct metadata and network data may be found in U.S. patent application Ser. No. 17/006,657, titled "System and Method for Determination of Network Operation Metrics and Generation of Network Operation Metrics Visualizations," filed Aug. 28, 2020, the entire contents of which have been previously incorporated herein by reference.

Based on monitoring the network traffic and the network constructs at least by obtaining and maintaining construct metadata and network data, the controller 908 may maintain a status of each construct within the environment 900 and learn routing information between constructs.

For example, the controller 908 may maintain routing information indicating how network traffic propagates from the transit gateways 928 (e.g., two deployed in HA mode, whereas a single gateway icon is illustrated due to space constraints) within the VPC 926 to the transit gateways 942 (e.g., two deployed in HA mode) within the VPC 940. This routing information may include any networking tunnels (e.g., IPSec or BGP tunnels) that may have been established between the transit gateways 942 and the transit gateways 946 (e.g., two deployed in HA mode). FIGS. 9C-9D illustrate exemplary gateway details for a selected gateway including routing information including an indication a destination for network traffic, a "via" column indicating an IP address through which a network may pass when propagating from the selected gateway to the corresponding destination, any networking tunnels that may be utilized (e.g., tunnel name: "tun-0A640038-0" of FIG. 9D), a "next hop IP" address, a "next hop gateway" and a status of the corresponding route (e.g., a row of the routing table 964).

Additionally, the controller 908 also maintains certain gateway information of a selected gateway (e.g., "AWS West Transit GW") in FIG. 9C pertaining to either of the transit gateways 942 of the VPC 940. For example, the listing 962 of FIG. 9C includes information maintained by the controller 908 such as names of on-prem connections ("West2-Colo" and "West2-Colo-Xing"), a spoke peer list ("West2-VPC1-GW" and "West2-VPC2-GW") and a transit peering list ("Azure-West-Transit-GW" and "Azure-East-Transit-GW", which are regions of a cloud by a second CSP not shown in FIG. 9A, wherein CSP-1 may be refer to AWS® and the second CSP may refer to AZURE®; however, other CSPs may be utilized). Thus, FIG. 9C illustrates that controller 908 provides to the gateway 942 certain routing information. As further shown in FIG. 9C, listings of CIDRs accessible to the gateway 942 (in some instances, directly accessible via a single hop) may also be provided by the controller 908 to the gateway 942, which may indicate native constructs to which the gateway 942 is attached (or otherwise in communication) (e.g., TGW CIDRs 10.91.0.0/16, 10.90.0.0/16, which refer to the native VPCs 912, 914 and constructs deployed therein).

Additionally, one listing of CIDRs accessible to the gateway 942 may also be provided by the controller 908 to the gateway 942 may indicate constructs to which the gateway 942 is communicatively coupled to via transit peering (e.g., via an intermediary transit gateway) (e.g., Transit Peering Site CIDRs 10.106.0.0/16, 10.105.0.0/16, which refer to the VPCs 926, 932 and constructs deployed therein).

Generally, as constructs are deployed or go offline and the environment 900 is altered, so too is the routing information of environment 900. Thus, the controller 908 may continually, e.g., a regular intervals or in response to certain user input, provide updated routing information to gateways deployed within the environment 900 thereby updating the "gateway detailed information," an example of which is illustrated in FIG. 9C and/or a gateway's routing table, an example of which is illustrated in FIG. 9D.

Referring to FIG. 9B, an exemplary illustration of a first visualization of a transit network visualization 952 generated by the visibility logic 304 is shown in accordance with some embodiments. In some embodiments, the transit network visualization 952 may be generated by the visibility logic 304. However, in other embodiments, the controller 908 may obtain any requisite data from the visibility logic 304 and generate the transit network visualization 952 (and the display portions discussed herein). The transit gateways listed in the display portion 958 include those deployed in the environment 900.

As shown, the transit network visualization 952 includes a main display portion 954 and a navigation panel 956. The main display portion 954 may include a plurality of display portions 958-960 with the display portion 958 including a listing of transit gateways deployed within the example cloud computing environment 900 of FIG. 9A. Additionally, the display portion 960 includes similar content as the listing of the display portion 958; however, a header is shown within additional rows for purposes of clarity. The listing of the display portion 958 includes a header, which provides an indication of the content of the rows of the listing, which include certain data pertaining to transit gateways: name, state, VPC CIDRs, HA mode (where HA refers to "high availability"), connection. For example, referring to row 959, which appears in a highlighted manner (e.g., rendered in a visually distinct manner from other rows) includes a name of "AWS WEST-TRANSIT GW", has a state of "UP" (e.g., its status is "up" or "active"), has a VPC Classless Inter-Domain Routing (CIDR) address of 10.102.0.0/16, has a HA mode of "ACTIVEMESH" (meaning two transit gateways are deployed within the corresponding VPC in an active-active configuration where both transit gateways may receive network traffic for routing), and Connection status of "YES" (which may indicate that the controller 908 is connected to the transit gateway).

The transit network visualization 952, through various display portions, may be configured to receive user input, such as selections of content (e.g., a particular row of the listing within the display portion 958, e.g., "AWS WEST-TRANSIT GW"). Upon receipt of user input indicating selection of content, e.g., "AWS WEST-TRANSIT GW," additional visualizations may be generated or otherwise caused to be rendered, where examples of such additional visualizations may include FIGS. 9C-9D.

Referring now to FIG. 9C, an exemplary illustration of a second visualization of the transit network visualization 952 generated by the visibility logic 304 is shown in accordance with some embodiments. The second visualization includes the listing 962 of information provided to the selected gateway (e.g., "AWS West Transit GW") that is maintained by the controller 908. Details of the listing 962 and its relationship to the environment 900 of FIG. 9A is discussed above.

Referring now to FIG. 9D, an exemplary illustration of a third visualization of a transit network visualization 952 generated by the visibility logic 304 is shown in accordance with some embodiments. As discussed above in combination with the discussion of FIG. 9A, the route table 962 may be programmed by a controller, e.g., the controller 908, to include routing information learned by the controller 908 through deploying constructs, monitoring the constructs and monitoring network traffic, optionally in combination with the visibility logic 340.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A distributed cloud computing system built in accordance with a repeatable network architecture, the distributed cloud computing system comprising:
   a controller;
   a first set of spoke gateways; and
   a first transit gateway;
   wherein the controller is configured to:
      deploy the first set of spoke gateways in a first cloud of a first cloud service provider (CSP) thereby forming an applications layer of the repeatable network architecture;
      deploy the first transit gateway in the first cloud thereby forming a global transit layer of the repeatable network architecture;
      wherein the applications layer and the global transit layer form a cloud core layer configured to be communicatively coupled to a cloud operations layer and a cloud access layer, the cloud access layer comprising constructs that provide network devices with access to constructs within the cloud core layer;
      establish communicative couplings between each of the first set of spoke gateways and the first transit gateway; and
      duplicate at least one construct from deployment in the first CSP to deployment in a second CSP, wherein the at least one construct and the duplicated construct are configured for use with constructs of the cloud operations layer and the cloud access layer,
      wherein the controller operates as a single instance that is deployed in the first CSP and is configured to receive authentication credentials from a user to access a cloud provided by the second CSP.

2. The distributed cloud computing system of claim 1, wherein the controller is configured to deploy a first set of spoke virtual private clouds (VPCs) within the first cloud, wherein each of the spoke VPCs has deployed therein one of the first set of spoke gateways.

3. The distributed cloud computing system of claim 2, wherein the controller is configured to deploy a first transit VPC within the first cloud, wherein the first transit gateway is deployed in the first transit VPC.

4. The distributed cloud computing system of claim 1, wherein the second CSP has a different number of constructs than the first CSP.

5. The distributed cloud computing system of claim 1, further comprising:
   a second set of spoke gateways; and
   a second transit gateway;
   wherein the controller is configured to:

deploy the second set of spoke gateways in a second cloud thereby extending the applications layer of the repeatable network architecture to the second cloud;

deploy the second transit gateway in the second cloud thereby extending the global transit layer of the repeatable network architecture to the second cloud; and establish communicative couplings between each of the second set of spoke gateways and the second transit gateway.

6. The distributed cloud computing system of claim 5, further comprising:

logic, stored on non-transitory, computer-medium, that, upon execution by one or more processors, causes performance of operations including:

receiving network traffic at the first transit gateway originating from a spoke VPC of the first set of spoke VPCs deployed in the first cloud;

routing the network traffic from the first transit gateway to the second transit gateway deployed in the second cloud; and routing the network traffic to a destination VPC deployed within the second cloud, wherein the destination VPC is one of a second set of spoke VPCs.

7. The distributed cloud computing system of claim 1, further comprising:

visibility logic deployed in a virtual machine instance within a cloud operations layer of the first cloud, wherein the visibility logic is stored on non-transitory, computer-medium, and upon execution by one or more processors, causes performance of operations including:

receiving, from the controller, metadata pertaining to a plurality of gateways deployed in the first cloud and a second cloud;

receiving, from each of the plurality of gateways, network data, wherein a combination of the metadata and the network data identify each of a plurality of constructs deployed in the first cloud and the second cloud, communication paths between each construct, and in which cloud each construct is deployed;

generating a visualization illustrating the plurality of constructs and the communication paths therebetween; and causing rendering of the visualization on a display screen of a network device.

8. The distributed cloud computing system of claim 1, wherein the controller programs a routing table of the first transit gateway with routing information obtained through monitoring at least one of network constructs or network traffic within the distributed cloud computing system.

9. A method for building a distributed cloud computing system in accordance with a repeatable network architecture, the method comprising:

deploying, by a controller of the distributed cloud computing system, a first set of spoke gateways in a first cloud thereby forming an applications layer of the repeatable network architecture;

deploying, by the controller, a first transit gateway in the first cloud thereby forming a global transit layer of the repeatable network architecture;

wherein the applications layer and the global transit layer form a cloud core layer configured to be communicatively coupled to a cloud operations layer and a cloud access layer, the cloud access layer comprising constructs that provide network devices with access to constructs within the cloud core layer;

establishing, by the controller, communicative couplings between each of the first set of spoke gateways and the first transit gateway; and duplicating, by the controller, at least one construct from deployment in a first cloud service provider (CSP) to a second CSP, wherein the at least one construct and the duplicated construct are configured for use with constructs of the cloud operations layer and the cloud access layer, wherein the controller operates as a single instance that is deployed in the first CSP and is configured to receive authentication credentials from a user to access a cloud provided by the second CSP.

10. The method of claim 9, wherein a controller, deployed within a cloud operations layer of the first cloud, is configured to deploy the first set of spoke gateways, deploy the first transit gateway and establish the communicative couplings therebetween.

11. The method of claim 9, further comprising:

deploying, by the controller, a first set of spoke virtual private clouds (VPCs) within the first cloud, wherein each of the spoke VPCs has deployed therein one of the first set of spoke gateways.

12. The method of claim 11, wherein the controller is configured to deploy a first transit VPC within the first cloud, and wherein the first transit gateway is deployed in the first transit VPC.

13. The method of claim 12, further comprising:

wherein the second CSP has a different number of constructs than the first CSP.

14. The method of claim 9, further comprising:

deploying, by the controller, a second set of spoke gateways in a second cloud thereby extending the applications layer of the repeatable network architecture to the second cloud;

deploying, by the controller, a second transit gateway in the second cloud thereby extending the global transit layer of the repeatable network architecture to the second cloud; and establishing, by the controller, communicative couplings between each of the second set of spoke gateways and the second transit gateway.

15. The method of claim 14, further comprising:

receiving, by the controller, network traffic at the first transit gateway originating from a spoke VPC of the first set of spoke VPCs deployed in the first cloud;

routing, by the controller, the network traffic from the first transit gateway to the second transit gateway deployed in the second cloud; and routing, by the controller, the network traffic to a destination VPC deployed within the second cloud, wherein the destination VPC is a VPC of a second set of spoke VPCs.

16. The method of claim 9, further comprising:

receiving, by visibility logic deployed in a virtual machine instance within a cloud operations layer of the first cloud from the controller, metadata pertaining to a plurality of gateways deployed in the first cloud and the second cloud;

receiving, by the visibility logic from each of the plurality of gateways, network data, wherein a combination of the metadata and the network data identify each of a plurality of constructs deployed in the first cloud and the second cloud, communication paths between each construct, and in which cloud each construct is deployed;

generating, by the controller, a visualization illustrating the plurality of constructs and the communication paths therebetween; and causing, by the controller, rendering of the visualization on a display screen of a network device.

17. The method of claim 9, further comprising:

programming, by the controller, a routing table of the first transit gateway with routing information obtained through monitoring at least one of network constructs or network traffic within the distributed cloud computing system.

18. A non-transitory computer-readable medium having stored thereon logic that, when executed by one or more processors, causes operations including:

deploying, by a controller of the distributed cloud computing system, a first set of spoke gateways in a first cloud thereby forming an applications layer of a repeatable network architecture;

deploying, by the controller, a first transit gateway in the first cloud thereby forming a global transit layer of the repeatable network architecture;

wherein the applications layer and the global transit layer form a cloud core layer configured to be communicatively coupled to a cloud operations layer and a cloud access layer, the cloud access layer comprising constructs that provide network devices with access to constructs within the cloud core layer;

establishing, by the controller, communicative couplings between each of the first set of spoke gateways and the first transit gateway; and duplicating, by the controller, at least one construct from deployment in a first cloud service provider (CSP) to a second CSP, wherein the at least one construct and the duplicated construct are configured for use with constructs of the cloud operations layer and the cloud access layer, wherein the controller operates as a single instance that is deployed in the first CSP and is configured to receive authentication credentials from a user to access a cloud provided by the second CSP.

19. The non-transitory computer-readable medium of claim 18, wherein a controller, deployed within a cloud operations layer of the first cloud, is configured to deploy the first set of spoke gateways, deploy the first transit gateway and establish the communicative couplings therebetween, and further comprising:

deploying, by the controller, a first set of spoke virtual private clouds (VPCs) within the first cloud, wherein each of the spoke VPCs has deployed therein one of the first set of spoke gateways; and programming, by the controller, a routing table of the first transit gateway with routing information obtained through monitoring at least one of network constructs or network traffic within the distributed cloud computing system.

20. The non-transitory computer-readable medium of claim 18, wherein the controller is configured to deploy a first transit VPC within the first cloud, wherein the first transit gateway is deployed in the first transit VPC, and further comprising:

deploying, by the controller, a second set of spoke gateways in a second cloud thereby extending the applications layer of the repeatable network architecture to the second cloud;

deploying, by the controller, a second transit gateway in the second cloud thereby extending the global transit layer of the repeatable network architecture to the second cloud; and establishing, by the controller, communicative couplings between each of the second set of spoke gateways and the second transit gateway.

* * * * *